(12) United States Patent
Shao et al.

(10) Patent No.: US 10,512,070 B2
(45) Date of Patent: Dec. 17, 2019

(54) USER EQUIPMENT, NETWORK DEVICE, AND METHOD FOR DETERMINING PHYSICAL UPLINK CONTROL CHANNEL RESOURCE

(71) Applicant: Huawei Technologies Co., Ltd., Shenzhen (CN)

(72) Inventors: Jiafeng Shao, Beijing (CN); Sha Ma, Beijing (CN); Chuanfeng He, Beijing (CN); Wei Quan, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 84 days.

(21) Appl. No.: 15/716,073

(22) Filed: Sep. 26, 2017

(65) Prior Publication Data

US 2018/0020434 A1 Jan. 18, 2018

Related U.S. Application Data

(63) Continuation of application No. PCT/CN2015/093258, filed on Oct. 29, 2015.

(30) Foreign Application Priority Data

Mar. 27, 2015 (WO) ................ PCT/CN2015/075251

(51) Int. Cl.
*H04W 72/04* (2009.01)
*H04L 5/00* (2006.01)
(Continued)

(52) U.S. Cl.
CPC ......... *H04W 72/042* (2013.01); *H04L 1/1861* (2013.01); *H04L 1/1864* (2013.01);
(Continued)

(58) Field of Classification Search
CPC ... H04L 1/0027; H04L 1/0031; H04L 1/0073; H04L 1/1607; H04L 1/1671;
(Continued)

(56) References Cited

U.S. PATENT DOCUMENTS 8,743,783 B2 * 6/2014 Han .................. H04L 1/0031
370/328
8,861,530 B2 * 10/2014 Han .................. H04W 72/00
370/329

(Continued)

FOREIGN PATENT DOCUMENTS

CN 102271032 A 12/2011
CN 102291832 A 12/2011
(Continued)

OTHER PUBLICATIONS

3GPP TS 36.211, 3rd Generation Partnership Project; Technical Specification Group Radio Access Network; Evolved Universal Terrestrial Radio Access (E-UTRA); Physical Channels and Modulation (Release 10), 103 pages, Sep. 2011.*

*Primary Examiner* — Frank Duong
(74) *Attorney, Agent, or Firm* — Leydig, Voit & Mayer, Ltd.

(57) ABSTRACT

Embodiments of the present invention provide a user equipment, a network device, and a method. The user equipment includes: a receiving unit, configured to receive a physical downlink control channel in an $n^{th}$ timeslot; and a processing unit, configured to determine a first PUCCH resource index of a first PUCCH in an $(n+k)^{th}$ timeslot according to a first resource index offset and a minimum index value, where the first resource index offset is used to indicate an offset of the resource index of the first PUCCH The processing unit is further configured to determine, according to the first PUCCH resource index, an index of a second physical (Continued)

resource block PRB on which a second PUCCH in the $(n+k)^{th}$ timeslot is located, and a second PUCCH resource on the second PRB.

17 Claims, 5 Drawing Sheets

(51) Int. Cl.
*H04W 72/12* (2009.01)
*H04L 1/18* (2006.01)
*H04L 1/00* (2006.01)

(52) U.S. Cl.
CPC ............ *H04L 5/0053* (2013.01); *H04W 72/04* (2013.01); *H04W 72/1278* (2013.01); *H04L 1/0027* (2013.01); *H04L 5/0094* (2013.01)

(58) Field of Classification Search
CPC ... H04L 1/1861; H04L 1/1864; H04L 5/0007; H04L 5/0026; H04L 5/003; H04L 5/0053; H04L 5/0055; H04L 5/0094; H04W 72/04; H04W 72/0413; H04W 72/042; H04W 72/0453; H04W 72/12; H04W 72/1278
See application file for complete search history.

(56) References Cited

U.S. PATENT DOCUMENTS

| | | | |
|---|---|---|---|
| 2011/0317653 | A1 | 12/2011 | Kwon et al. |
| 2012/0039285 | A1 | 2/2012 | Seo et al. |
| 2013/0010742 | A1 | 1/2013 | Han et al. |
| 2014/0133373 | A1 | 5/2014 | Han et al. |
| 2014/0219202 | A1 | 8/2014 | Kim et al. |
| 2014/0293909 | A1 | 10/2014 | Xu et al. |
| 2016/0192348 | A1 | 6/2016 | Dai et al. |
| 2018/0255542 | A1* | 9/2018 | Seo ............................ H04L 1/18 |

FOREIGN PATENT DOCUMENTS

| | | |
|---|---|---|
| CN | 102379150 A | 3/2012 |
| CN | 103427940 A | 12/2013 |
| CN | 103516474 A | 1/2014 |
| CN | 103684714 A | 3/2014 |
| WO | 2011075864 A1 | 6/2011 |

\* cited by examiner

700

Send a physical downlink control channel in an $n^{th}$ timeslot to a user UE, so that the UE determines, according to a first resource offset, a first PUCCH resource index of a first PUCCH in an $(n+k)^{th}$ timeslot corresponding to the physical downlink control channel, where the first resource index offset is used to indicate an offset of the resource index of the first PUCCH  ~ 710

Send resource offset information to the UE, where the resource offset information is used to indicate offset information of a resource on which a second PUCCH in the $(n+k)^{th}$ timeslot is located, so that the UE determines, according to the first PUCCH resource index and the resource offset information, an index of a second PRB on which the second PUCCH in the $(n+k)^{th}$ timeslot is located, and a second PUCCH resource of the second PUCCH on the second PRB  ~ 720

FIG. 7

USER EQUIPMENT, NETWORK DEVICE, AND METHOD FOR DETERMINING PHYSICAL UPLINK CONTROL CHANNEL RESOURCE

CROSS-REFERENCE TO RELATED APPLICATIONS

This application is a continuation of International Application No. PCT/CN2015/093258, filed on Oct. 29, 2015, which claims priority to International Application No. PCT/CN2015/075251, filed on Mar. 27, 2015. The disclosures of the aforementioned applications are hereby incorporated by reference in their entireties.

TECHNICAL FIELD

The embodiments of the present invention relate to the communications field, and in particular, to user equipment, a network device, and a method for determining a physical uplink control channel resource.

BACKGROUND

In a Long Term Evolution (LTE) system, a physical downlink control channel (PDCCH) is carried on a control channel element (CCE), and the PDCCH channel may be transmitted on {1, 2, 4, 8} CCEs according to a size of a downlink control indicator (DCI) on the PDCCH or a channel quality status. A function of the PDCCH includes indicating scheduling of a physical downlink shared channel (PDSCH). If both a PDSCH and a PDCCH corresponding to the PDSCH exist in a subframe n, for whether downlink data transmitted in the subframe n is correctly received, a user (UE) needs to feed back an acknowledgement (ACK)/a negative acknowledgement (NACK) through a physical uplink control channel (PUCCH) in a subframe (n+k) to an enhanced node B (E-UTRAN Node B, eNB), and then the eNB determines, according to the feedback from the UE, whether to perform retransmission. Herein, an uplink-downlink subframe correspondence between the subframe n and the subframe n+k is predefined.

In a current LTE system, a subframe length is 1 ms, each subframe consists of two timeslots (slot) of a 0.5-ms length, and a length of a transmission time interval (TTI) is 1 ms. All scheduling is performed in a minimum scheduling unit of TTI. A round trip time (RTT) is 8 ms. Because one PUCCH may be unable to carry all content, two PUCCHs are generally transmitted in one subframe, and the two PUCCHs are transmitted in two timeslots respectively.

To achieve a shorter RTT and a lower data transmission latency, a scenario is proposed in which a TTI length is set to 0.5 ms or less. When UE transmits a PUCCH, a length of one TTI is 0.5 ms or less than 0.5 ms. According to the conventional art, only one PUCCH can be transmitted in one TTI of a length less than or equal to 0.5 ms, and the one PUCCH transmitted in the one TTI may be unable to carry all content. Currently, no corresponding solution is provided for this problem. Therefore, a method for determining a PUCCH resource needs to be proposed to resolve the problem that one PUCCH in one timeslot cannot carry all content in a communications system.

SUMMARY

Embodiments of the present invention provide user equipment, a network device, and a method for determining a physical uplink control channel resource, so that two physical uplink control channel resources can be allocated in one timeslot, thereby resolving the problem that one physical uplink control channel in one timeslot cannot carry all content.

According to a first aspect, user equipment is provided, where the apparatus includes: a receiving unit, configured to receive a physical downlink control channel in an $n^{th}$ timeslot; and a processing unit, configured to determine a first PUCCH resource index of a first PUCCH in an $(n+k)^{th}$ timeslot according to a first resource index offset and a minimum index value, where the first resource index offset is used to indicate an offset of the resource index of the first PUCCH, the first resource index offset is obtained from higher layer signaling, the minimum index value is a minimum index value of a control channel element that carries the physical downlink control channel, and k is a preset positive integer; where the processing unit is further configured to determine, according to the first PUCCH resource index, an index of a second physical resource block PRB on which a second PUCCH in the $(n+k)^{th}$ timeslot is located, and a second PUCCH resource on the second PRB.

With reference to the first aspect, in a first possible implementation, the receiving unit is further configured to receive resource offset information, where the resource offset information is used to indicate offset information of a resource on which the second PUCCH in the $(n+k)^{th}$ timeslot is located; and the processing unit is specifically configured to determine the index of the second PRB and the second PUCCH resource according to the first PUCCH resource index and the resource offset information.

With reference to the first possible implementation, in a second possible implementation, the processing unit is specifically configured to: determine a relative offset of a second resource index according to the resource offset information, where the relative offset of the second resource index is an offset of a second PUCCH resource index relative to the first PUCCH resource index; determine the second PUCCH resource index according to the first PUCCH resource index and the relative offset of the second resource index; and determine the index of the second PRB and the second PUCCH resource according to the second PUCCH resource index.

With reference to the second possible implementation, in a third possible implementation, the processing unit is specifically configured to: when m mod 2=0, the second PUCCH resource index=the first PUCCH resource index+the relative offset of the second resource index; or when m mod 2=1, the second PUCCH resource index=the first PUCCH resource index−the relative offset of the second resource index, where m is an index of the first PRB, and m is an integer that is greater than or equal to 0.

With reference to the first, second, or third possible implementation, in a fourth possible implementation, the resource offset information includes a first relative offset and a second relative offset, the first relative offset is an offset of the index of the second PRB relative to the index of the first PRB, and the second relative offset is an offset of the second PUCCH resource relative to the first PUCCH resource; the receiving unit is specifically configured to receive the first relative offset and the second relative offset; and the processing unit is specifically configured to determine the relative offset of the second resource index according to the first relative offset and the second relative offset.

With reference to the fourth possible implementation, in a fifth possible implementation, the processing unit is specifically configured to determine the relative offset N of the second resource index according to the following formula:

$$N = i * c * N_{SC}^{RB} / \Delta_{shift}^{PUCCH} + j,$$

where i is the first relative offset, j is the second relative offset, c is a quantity of orthogonal sequences used within one PRB, $N_{SC}^{RB}$ is a quantity of subcarriers in a frequency domain within one PRB, and $\Delta_{shift}^{PUCCH}$ is a cyclic shift step of a PUCCH.

With reference to the first, second, or third possible implementation, in a sixth possible implementation, the resource offset information includes a first relative offset and the second PUCCH resource, and the first relative offset is an offset of the index of the second PRB relative to the index of the first PRB; the receiving unit is specifically configured to receive the first relative offset and the second PUCCH resource; and the determining unit is specifically configured to determine the relative offset of the second resource index according to the first relative offset and the second PUCCH resource.

With reference to the sixth possible implementation, in a seventh possible implementation, the processing unit is specifically configured to determine the relative offset N of the second resource index according to the following formula:

$$N = v * c * N_{SC}^{RB} / \Delta_{shift}^{PUCCH} + t,$$

where v is the first relative offset, t is the second PUCCH resource, c is a quantity of orthogonal sequences used within one PRB, $N_{SC}^{RB}$ is a quantity of subcarriers in a frequency domain, $\Delta_{shift}^{PUCCH}$ is a cyclic shift step of a PUCCH, t is any integer in $\{0 \sim c * N_{SC}^{RB} / \Delta_{shift}^{PUCCH} - 1\}$, and v is an integer that is greater than or equal to 0.

With reference to the first aspect, in an eighth possible implementation, the determining unit is specifically configured to: determine, according to the first PUCCH resource index, an index of a first PRB on which the first PUCCH in the $(n+k)^{th}$ timeslot is located, and a first PUCCH resource of the first PUCCH on the first PRB; determine the second PUCCH resource according to the first PUCCH resource, where the second PUCCH resource and the first PUCCH resource meet a preset relationship; and determine the index of the second PRB according to the index of the first PRB.

With reference to the eighth possible implementation, in a ninth possible implementation, the processing unit is specifically configured to: when m mod 2=0, determine that the index of the second PRB is m+q; or when m mod 2=1, determine that the index of the second PRB is m−q, where m is the index of the first PRB, m is an integer that is greater than or equal to 0, q is any integer in $\{0 \sim \lfloor N_{RB}^{UL}/2 \rfloor\}$, and $N_{RB}^{UL}$ is a quantity of uplink bandwidth resource blocks.

With reference to the first aspect, in a tenth possible implementation of the first aspect, when the first PUCCH and the second PUCCH are in a first PUCCH format, the index of the second PRB is identical to the index of the first PRB; or when the first PUCCH and the second PUCCH are in a second PUCCH format, there is an interval p between the index of the second PRB and the index of the first PRB, where p is any integer in $\{1 \sim \lfloor N_{RB}^{UL}/2 \rfloor\}$ or $\{-\lfloor N_{RB}^{UL}/2 \rfloor \sim -1\}$, and $N_{RB}^{UL}$ is a quantity of uplink bandwidth resource blocks.

With reference to the first aspect, in an eleventh possible implementation, an index of a first PRB on which the first PUCCH is located is identical to the index of the second PRB, and the processing unit is further configured to: determine a number of the first PRB according to the index of the first PRB; and determine a number of the second PRB according to the index of the second PRB.

With reference to the eleventh possible implementation, in a twelfth possible implementation, the processing unit is specifically configured to determine $n_{first\ PRB}$, the number of the first PRB according to $m_1$, the index of the first PRB by using the following formula:

$$n_{first\ PRB} = \left\lfloor \frac{m_1}{2} \right\rfloor;$$

and the processing unit is specifically configured to determine $n_{second\ PRB}$, the number of the first PRB according to $m_2$, the index of the second PRB by using the following formula:

$$n_{second\ PRB} = N_{RB}^{UL} - 1 - \left\lfloor \frac{m_2}{2} \right\rfloor,$$

where $N_{RB}^{UL}$ is a quantity of uplink bandwidth resource blocks.

With reference to the eleventh possible implementation, in a thirteenth possible implementation, the processing unit is specifically configured to determine $n_{first\ PRB}$, the number of the first PRB according to $m_1$, the index of the first PRB by using the following formula:

$$n_{first\ PRB} = N_{RB}^{UL} - 1 - \left\lfloor \frac{m_1}{2} \right\rfloor;$$

and the processing unit is specifically configured to determine $n_{second\ PRB}$, the number of the first PRB according to $m_2$, the index of the second PRB by using the following formula:

$$n_{second\ PRB} = \left\lfloor \frac{m_2}{2} \right\rfloor,$$

where $N_{RB}^{UL}$ is a quantity of uplink bandwidth resource blocks.

With reference to the first aspect or any one of the foregoing possible implementations, in a fourteenth possible implementation, the user equipment further includes a sending unit, configured to send the first PUCCH and the second PUCCH, where information carried by the first PUCCH and information carried by the second PUCCH meet a preset relationship.

With reference to the first aspect or any one of the foregoing possible implementations, in a fifteenth possible implementation, a length of one timeslot is a length of t single carrier frequency division multiple access SC-FDMA symbols, where t is a positive integer that is less than or equal to 7.

According to a second aspect, a network device is provided, where the apparatus includes: a first sending unit, configured to send a physical downlink control channel in an $n^{th}$ timeslot to a user UE, so that the UE determines, according to a first resource index offset, a first PUCCH resource index of a first PUCCH in an $(n+k)^{th}$ timeslot corresponding to the physical downlink control channel, where the first resource index offset is used to indicate an offset of the resource index of the first PUCCH; and a second sending unit, configured to send resource offset information to the UE, where the resource offset information is used to indicate offset information of a resource on which a second PUCCH in the $(n+k)^{th}$ timeslot is located, so that the UE determines, according to the first PUCCH resource index and the resource offset information, an index of a second PRB on which the second PUCCH in the $(n+k)^{th}$ timeslot is located, and a second PUCCH resource of the second PUCCH on the second PRB.

With reference to the second aspect, in a first possible implementation of the second aspect, the network device further includes: a third sending unit, configured to send the first resource index offset to the UE by using higher layer signaling.

With reference to the second aspect or the first possible implementation of the second aspect, in a second possible implementation of the second aspect, the resource offset information includes a first relative offset and a second relative offset, the first relative offset is an offset of the index of the second PRB relative to an index of the first PRB, and the second relative offset is an offset of the second PUCCH resource relative to the first PUCCH resource; and the second sending unit is specifically configured to send the first relative offset and the second relative offset to the UE.

With reference to the second aspect or the first possible implementation of the second aspect, in a third possible implementation of the second aspect, the resource offset information includes a first relative offset and the second PUCCH resource, where the first relative offset is an offset of the index of the second PRB relative to an index of the first PRB; and the second sending unit is specifically configured to send the first relative offset and the second PUCCH resource to the UE.

With reference to the second aspect or any one of the foregoing possible implementations of the second aspect, in a fourth possible implementation of the second aspect, the network device further includes: a receiving unit, configured to receive the first PUCCH and the second PUCCH, where information carried by the first PUCCH and information carried by the second PUCCH meet a preset relationship.

With reference to the second aspect or any one of the foregoing possible implementations of the second aspect, in a fifth possible implementation of the second aspect, a length of one timeslot is a length of t single carrier frequency division multiple access SC-FDMA symbols, and t is a positive integer that is less than or equal to 7.

According to a third aspect, a method for determining a physical uplink control channel PUCCH resource is provided, where the method includes: receiving a physical downlink control channel in an $n^{th}$ timeslot; determining a first PUCCH resource index of a first PUCCH in an $(n+k)^{th}$ timeslot according to a first resource index offset and a minimum index value, where the first resource index offset is used to indicate an offset of the resource index of the first PUCCH, the first resource index offset is obtained from higher layer signaling, the minimum index value is a minimum index value of a control channel element that carries the physical downlink control channel, and k is a preset positive integer; and determining, according to the first PUCCH resource index, an index of a second physical resource block PRB on which a second PUCCH in the $(n+k)^{th}$ timeslot is located, and a second PUCCH resource on the second PRB.

With reference to the third aspect, in a first possible implementation of the third aspect, the method further includes: receiving resource offset information, where the resource offset information is used to indicate offset information of a resource on which the second PUCCH in the $(n+k)^{th}$ timeslot is located; and the determining, according to the first PUCCH resource index, an index of a second PRB on which a second PUCCH in the $(n+k)^{th}$ timeslot is located, and a second PUCCH resource on the second PRB includes: determining the index of the second PRB and the second PUCCH resource according to the first PUCCH resource index and the resource offset information.

With reference to the first possible implementation of the third aspect, in a second possible implementation of the third aspect, the determining the index of the second PRB and the second PUCCH resource according to the first PUCCH resource index and the resource offset information includes: determining a relative offset of a second resource index according to the resource offset information, where the relative offset of the second resource index is an offset of a second PUCCH resource index relative to the first PUCCH resource index; determining the second PUCCH resource index according to the first PUCCH resource index and the relative offset of the second resource index; and determining the index of the second PRB and the second PUCCH resource according to the second PUCCH resource index.

With reference to the second possible implementation of the third aspect, in a third possible implementation of the third aspect, the determining the second PUCCH resource index according to the first PUCCH resource index and the relative offset of the second resource index includes: when m mod 2=0, the second PUCCH resource index=the first PUCCH resource index+the relative offset of the second resource index; or when m mod 2=1, the second PUCCH resource index=the first PUCCH resource index−the relative offset of the second resource index, where m is an index of the first PRB, and m is an integer that is greater than or equal to 0.

With reference to the first, second, or third possible implementation of the third aspect, in a fourth possible implementation of the third aspect, the resource offset information includes a first relative offset and a second relative offset, the first relative offset is an offset of the index of the second PRB relative to the index of the first PRB, and the second relative offset is an offset of the second PUCCH resource relative to the first PUCCH resource; the receiving resource offset information includes: receiving the first relative offset and the second relative offset; and the determining a relative offset of a second resource index according to the resource offset information includes: determining the relative offset of the second resource index according to the first relative offset and the second relative offset.

With reference to the fourth possible implementation of the third aspect, in a fifth possible implementation of the third aspect, the determining the relative offset of the second resource index according to the first relative offset and the second relative offset includes: determining the relative offset N of the second resource index according to the following formula:

$$N = i * c * N_{SC}^{RB} / \Delta_{shift}^{PUCCH} + j,$$

where i is the first relative offset, j is the second relative offset, c is a quantity of orthogonal sequences used within one PRB, $N_{SC}^{RB}$ is a quantity of subcarriers in a frequency domain within one PRB, and $\Delta_{shift}^{PUCCH}$ is a cyclic shift step of a PUCCH.

With reference to the first, second, or third possible implementation of the third aspect, in a sixth possible implementation of the third aspect, the resource offset information includes a first relative offset and the second PUCCH resource, the first relative offset is an offset of the index of the second PRB relative to the index of the first PRB; the receiving resource offset information includes: receiving the first relative offset and the second PUCCH resource; and the determining a relative offset of a second resource index according to the resource offset information includes: determining the relative offset of the second resource index according to the first relative offset and the second PUCCH resource.

With reference to the sixth possible implementation of the third aspect, in a seventh possible implementation of the third aspect, the determining the relative offset of the second resource index according to the first relative offset and the second PUCCH resource includes: determining the relative offset N of the second resource index according to the following formula:

$$N = v * c * N_{SC}^{RB} / \Delta_{shift}^{PUCCH} + t,$$

where v is the first relative offset, t is the second PUCCH resource, c is a quantity of orthogonal sequences used within one PRB, $N_{SC}^{RB}$ is a quantity of subcarriers in a frequency domain within one PRB, $\Delta_{shift}^{PUCCH}$ is a cyclic shift step of a PUCCH, t is any integer in $\{0 \sim c * N_{SC}^{RB} / \Delta_{shift}^{PUCCH} - 1\}$, and v is an integer that is greater than or equal to 0.

With reference to the third aspect, in an eighth possible implementation of the third aspect, the determining, according to the first PUCCH resource index, an index of a second PRB and a second PUCCH resource includes: determining, according to the first PUCCH resource index, an index of a first PRB on which the first PUCCH in the $(n+k)^{th}$ timeslot is located, and a first PUCCH resource of the first PUCCH on the first PRB; determining the second PUCCH resource according to the first PUCCH resource, where the second PUCCH resource and the first PUCCH resource meet a preset relationship; and determining the index of the second PRB according to the index of the first PRB.

With reference to the eighth possible implementation of the third aspect, in a ninth possible implementation of the third aspect, the determining the index of the second PRB according to the index of the first PRB includes: when m mod 2=0, determining that the index of the second PRB is m+q; or when m mod 2=1, determining that the index of the second PRB is m−q, where m is the index of the first PRB, m is an integer that is greater than or equal to 0, q is any integer in $\{0 \sim \lfloor N_{RB}^{UL}/2 \rfloor\}$, and $N_{RB}^{UL}$ is a quantity of uplink bandwidth resource blocks.

With reference to the third aspect, in a tenth possible implementation of the third aspect, when the first PUCCH and the second PUCCH are in a first PUCCH format, the index of the second PRB is identical to the index of the first PRB on which the first PUCCH is located; or when the first PUCCH and the second PUCCH are in a second PUCCH format, there is an interval p between the index of the second PRB and the index of the first PRB on which the first PUCCH is located, where p is any integer in $\{1 \sim N_{RB}^{UL}/2\}$ or $\{-\lfloor N_{RB}^{UL}/2 \rfloor \sim -1\}$, and $N_{RB}^{UL}$ is a quantity of uplink bandwidth resource blocks.

With reference to the third aspect, in an eleventh possible implementation of the third aspect, the index of the first PRB on which the first PUCCH is located is identical to the index of the second PRB, and the method further includes: determining a number of the first PRB according to the index of the first PRB; and determining a number of the second PRB according to the index of the second PRB.

With reference to the eleventh possible implementation of the third aspect, in a twelfth possible implementation of the third aspect, the determining a number of the first PRB according to the index of the first PRB includes determining $n_{first\ PRB}$, the number of the first PRB according to $m_1$, the index of the first PRB by using the following formula:

$$n_{first\ PRB} = \left\lfloor \frac{m_1}{2} \right\rfloor;$$

and the determining a number of the second PRB according to the index of the second PRB includes determining $n_{second\ PRB}$, the number of the second PRB according to $m_2$ the index of the second PRB by using the following formula:

$$n_{second\ PRB} = N_{RB}^{UL} - 1 - \left\lfloor \frac{m_2}{2} \right\rfloor,$$

where $N_{RB}^{UL}$ is a quantity of uplink bandwidth resource blocks.

With reference to the eleventh possible implementation of the third aspect, in a thirteenth possible implementation of the third aspect, the determining a number of the first PRB according to the index of the first PRB includes determining $n_{first\ PRB}$, the number of the first PRB according to $m_1$, the index of the first PRB by using the following formula:

$$n_{first\ PRB} = N_{RB}^{UL} - 1 - \left\lfloor \frac{m_1}{2} \right\rfloor;$$

and the determining a number of the second PRB according to the index of the second PRB includes determining $n_{second\ PRB}$, the number of the first PRB according to $m_2$, the index of the second PRB by using the following formula:

$$n_{second\ PRB} = \left\lfloor \frac{m_2}{2} \right\rfloor,$$

where $N_{RB}^{UL}$ is a quantity of uplink bandwidth resource blocks.

With reference to the third aspect or any one of the foregoing possible implementations of the third aspect, in a fourteenth possible implementation of the third aspect, the method further includes: sending the first PUCCH and the second PUCCH, where information carried by the first PUCCH and information carried by the second PUCCH meet a preset relationship.

With reference to the third aspect or any one of the foregoing possible implementations of the third aspect, in a fifteenth possible implementation of the third aspect, a length of one timeslot is a length of t single carrier frequency division multiple access SC-FDMA symbols, and t is a positive integer that is less than or equal to 7.

According to a fourth aspect, a method for determining a physical uplink control channel PUCCH resource is provided, where the method includes: sending a physical downlink control channel in an $n^{th}$ timeslot to a user UE, so that the UE determines, according to a first resource index offset, a first PUCCH resource index of a first PUCCH in an $(n+k)^{th}$ timeslot corresponding to the physical downlink control channel, where the first resource index offset is used to indicate an offset of the resource index of the first PUCCH; and sending resource offset information to the UE, where the resource offset information is used to indicate offset information of a resource on which a second PUCCH in the $(n+k)^{th}$ timeslot is located, so that the UE determines, according to the first PUCCH resource index and the resource offset information, an index of a second PRB on which the second PUCCH in the $(n+k)^{th}$ timeslot is located, and a second PUCCH resource of the second PUCCH on the second PRB.

With reference to the fourth aspect, in a first possible implementation of the fourth aspect, the method includes: sending the first resource index offset to the UE by using higher layer signaling.

With reference to the fourth aspect or the first possible implementation of the fourth aspect, in a second possible implementation of the fourth aspect, the resource offset information includes a first relative offset and a second relative offset, where the first relative offset is an offset of the index of the second PRB relative to an index of a first PRB, and the second relative offset is an offset of the second PUCCH resource relative to the first PUCCH resource; and the sending resource offset information to the UE includes sending the first relative offset and the second relative offset to the UE.

With reference to the fourth aspect or the first possible implementation of the fourth aspect, in a third possible implementation of the fourth aspect, the resource offset information includes a first relative offset and the second PUCCH resource, and the first relative offset is an offset of the index of the second PRB relative to an index of a first PRB; and the sending resource offset information to the UE includes: sending the first relative offset and the second PUCCH resource to the UE.

With reference to the fourth aspect or any one of the foregoing possible implementations of the fourth aspect, in a fourth possible implementation of the fourth aspect, the method further includes: receiving the first PUCCH and the second PUCCH, where information carried by the first PUCCH and information carried by the second PUCCH meet a preset relationship.

With reference to the fourth aspect or any one of the foregoing possible implementations of the fourth aspect, in a fifth possible implementation of the fourth aspect, a length of one timeslot is a length of t single carrier frequency division multiple access SC-FDMA symbols, and t is a positive integer that is less than or equal to 7.

Therefore, according to the user equipment, the network device, and the method for determining a physical uplink control channel resource in the embodiments of the present invention, two physical uplink control channel resources can be allocated in one timeslot, thereby resolving a problem that one physical uplink control channel in one timeslot cannot carry all content.

BRIEF DESCRIPTION OF DRAWINGS

To describe the technical solutions in the embodiments of the present invention more clearly, the following briefly describes the accompanying drawings required for describing the embodiments of the present invention. Apparently, the accompanying drawings in the following description show merely some embodiments of the present invention, and a person of ordinary skill in the art may still derive other drawings from these accompanying drawings without creative efforts.

FIG. 7 is a schematic flowchart of a method for determining a physical uplink control channel resource according to another embodiment of the present invention.

DESCRIPTION OF EMBODIMENTS

The following clearly and completely describes the technical solutions in the embodiments of the present invention with reference to the accompanying drawings in the embodiments of the present invention. Apparently, the described embodiments are a part rather than all of the embodiments of the present invention. All other embodiments obtained by a person of ordinary skill in the art based on the embodiments of the present invention without creative efforts shall fall within the protection scope of the present invention.

In the conventional art, for different PUCCH formats (format), such as format 1/1a/1b, format 2/2a/2b, and format 3, manners for determining a PUCCH resource used by user equipment (UE) are different.

First, according to a configured higher-layer parameter, distribution statuses of PUCCHs in different formats are different in one subframe.

Figure 1:
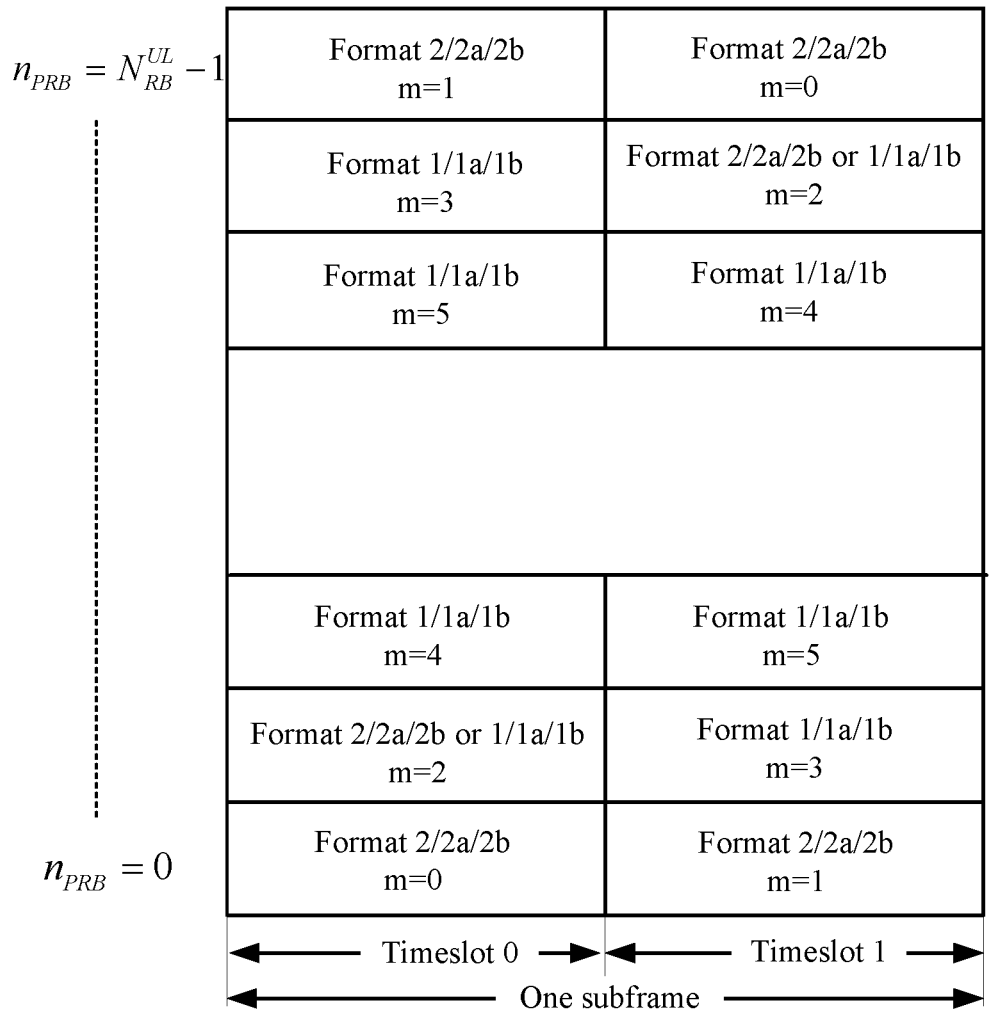
FIG. 1 is a schematic diagram of allocation of a physical uplink control channel resource in a 1-ms TTI in a communications system.

As shown in FIG. 1: (1) a PUCCH in format 2/2a/2b is distributed at an outermost available spectrum resource (for example, m=0, and m=1), where m, an index of a PRB on which the PUCCH is located is calculated according to a configured higher-layer parameter; (2) a PUCCH in format 1/1a/1b and a PUCCH in format 2/2a/2b are mixed at a middle available spectrum resource (for example, m=2, and m=3); (3) a PUCCH in format 1/1a/1b is at an inside available spectrum resource (for example, m=4, and m=5); and (4) a PUCCH in format 3 is at any position, that is m is equal to any number.

Then, m, the index of the PRB corresponding to a PUCCH resource index in a 1-ms subframe and a resource in the PRB are determined.

A quantity of PUCCH resources that can be carried by one PRB may be calculated according to the formula $c * N_{SC}^{RB} / \Delta_{shift}^{PUCCH}$, where c is a quantity of orthogonal sequences (orthogonal sequence) used within one physical resource block, and c depends on a type of a cyclic prefix (Cyclic Prefix, CP). For a normal cyclic prefix, c=3, and for an extended cyclic prefix, c=2. $\Delta_{shift}^{PUCCH}$ is configured by a higher layer, and may be 1, 2, or 3. $N_{SC}^{RB}$ is a quantity of subcarriers in a frequency domain within one PRB, and is 12.

For example, if c=3, $\Delta_{shift}^{PUCCH}=1$, and $N_{SC}^{RB}=12$, one PRB can carry a maximum of $36^{PUCCH}$ resources. In this case, a quantity of PUCCH resources within one PRB is 0 to 35.

(1) Determine a PUCCH resource associated with a PDCCH. The UE calculates a PUCCH resource index $n_{PUCCH}$ by using a PUCCH resource index offset $N_{PUCCH}^{(1)}$ that is configured by a higher layer and a minimum index value of a CCE that carries the PDCCH; and calculates, according to $n_{PUCCH}$ and a predefined mapping relationship, m, the index of the PRB on which the PUCCH is located and the PUCCH resource used by the UE in the PRB.

The following uses an example to describe a method for calculating the PUCCH resource index $n_{PUCCH}$.

For example, the PUCCH resource index may be calculated according to the following formula:

$$n_{PUCCH}^{(1)} = n_{CCE} + N_{PUCCH}^{(1)},$$

where $n_{CCE}$ is the minimum index value of the CCE.

When multiple antenna ports are configured, the PUCCH resource index further needs to be calculated according to the antenna ports. For example, when two antenna ports $p_0$ and $p_1$ are configured, the PUCCH resource index corresponding to a PUCCH on a) first antenna port $n_{PUCCH}^{(1,\tilde{p}_0)} = n_{CCE} + N_{PUCCH}^{(1)}$, and the PUCCH resource index corresponding to a PUCCH on a second antenna port $n_{PUCCH}^{(1,\tilde{p}_1)} = n_{CCE} + N_{PUCCH}^{(1)}$.

The following uses an example to describe the predefined mapping relationship. It is assumed that one PRB can carry $36^{PUCCH}$ resources. When the PUCCH resource index is 0 to 35, if m=0, a quantity of PUCCH resources in the PRB is 0 to 35. Correspondingly, when the PUCCH resource index is 36 to 71, if m=1, the quantity of PUCCH resources in the PRB is 0 to 35, and so on and so forth.

If one PRB can carry 36 PUCCH resources, after calculating the PUCCH resource index $n_{PUCCH}$=36, the UE may obtain by means of calculation, according to the PUCCH resource index and the foregoing predefined mapping relationship, that a quantity of PUCCH resources sent in a PRB with m=1 is 0.

(2) Determine a PUCCH resource associated with an EPDCCH. The UE obtains the PUCCH resource index $n_{PUCCH}$ by using a PUCCH resource index offset $N_{PUCCH,q}^{(e1)}$ that is configured by a higher layer, a hybrid automatic repeat-request acknowledgement (HARQ-ACK) resource offset $\Delta_{ARO}$, and a minimum index value of an ECCE that carries the EPDCCH; and then calculates, according to n and the predefined mapping relationship, m, the index of the PRB on which the PUCCH is located and the PUCCH resource used by the UE in the PRB.

The following uses an example to describe a method for calculating the PUCCH resource index $n_{PUCCH}$.

For example, the PUCCH resource index may be calculated according to the following formula:

$$n_{PUCCH}^{(1)} = n_{ECCE,q} + \Delta_{ARO} + N_{PUCCH,q}^{(e1)},$$

where $n_{ECCE,q}$ is the minimum index value of the ECCE.

When multiple antenna ports are configured, the PUCCH resource index further needs to be calculated according to the antenna ports. For example, when two antenna ports $p_0$ and $p_1$ are configured, the PUCCH resource index corresponding to a PUCCH on a first antenna port $n_{PUCCH}^{(1,\tilde{p}_0)} = n_{ECCE,q} + \Delta_{ARO} + N_{PUCCH,q}^{(e1)}$, and the PUCCH resource index corresponding to a PUCCH on a second antenna port $n_{PUCCH}^{(1,\tilde{p}_1)} = n_{ECCE,q} 1 + \Delta_{ARO} + N_{PUCCH,q}^{(e1)}$.

The meaning of the minimum index value of the CCE is that, if the PDCCH is carried on CCE 0, CCE 2, CCE 4, and CCE 8, the index 0 of the CCE is the minimum index value of the CCE for the PDCCH. Correspondingly, the meaning of the minimum index value of the ECCE is that, if the EPDCCH is carried on ECCE 0, ECCE 1, ECCE 3, and ECCE 4, the index 0 of the ECCE is the minimum index value of the ECCE for the EPDCCH.

It should be understood that in the embodiments of the application, user equipment (UE) may be but is not limited to a mobile station (MS, Mobile Station), a mobile terminal (Mobile Terminal), a mobile phone (Mobile Telephone), a handset (handset), a portable device (portable equipment), or the like. The user equipment may communicate with one or more core networks through a radio access network (RAN). For example, the user equipment may be a portable, pocket-sized, handheld, computer built-in, or in-vehicle mobile apparatus. The user equipment may be a mobile phone (also referred to as a "cell" phone) or a computer that has a wireless communications function, or the user equipment may be a portable, pocket-sized, handheld, computer built-in, or in-vehicle mobile apparatus.

The embodiments of the present invention may be applied to radio networks of different standards. A radio access network may include different network devices in different systems. For example, network devices in the radio access network in LTE and LTE-A include an evolved NodeB (eNB), and network devices in the radio access network in the WCDMA include a radio network controller (RNC) and a NodeB. Similarly, Worldwide Interoperability for Microwave Access (WiMAX) or another network may also use a solution similar to the embodiments of the present invention, but related modules in a base station system may be different. This is not limited in the embodiments of the present invention. However, for ease of description, an eNodeB is used as an example in the following embodiments.

It should be further understood that the embodiments of the present invention may be applied to a communications system with a shorter TTI length. For example, the TTI length may be equal to or less than 0.5 ms. This is not limited in the embodiments of the present invention. For ease of description, in the following embodiments, a communications system in which the TTI length is 0.5 ms is used as an example for description.

Figure 2:
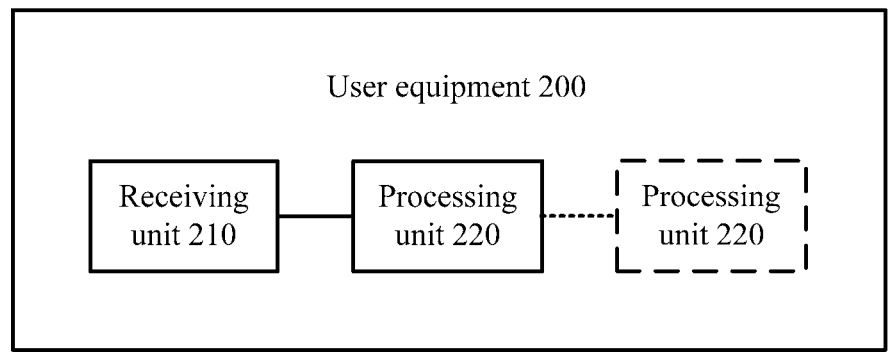
FIG. 2 is a schematic block diagram of user equipment according to an embodiment of the present invention.

FIG. 2 is a schematic block diagram of UE according to an embodiment of the present invention. The UE 200 in FIG. 2 may include a receiving unit 210 and a processing unit 220.

The receiving unit 210 is configured to receive a physical downlink control channel in an $n^{th}$ timeslot.

The processing unit 220 is configured to determine a first PUCCH resource index of a first PUCCH in an $(n+k)^{th}$ timeslot according to a first resource index offset and a minimum index value, where the first resource index offset is used to indicate an offset of the resource index of the first PUCCH, the first resource index offset is obtained from higher layer signaling, the minimum index value is a minimum index value of a control channel element that carries the physical downlink control channel, and k is a preset positive integer.

It should be understood that an index of a first PRB on which the first PUCCH is located and a first PUCCH resource on the first PRB may be determined according to the first PUCCH resource index and a preset mapping relationship.

The processing unit 220 is further configured to determine, according to the first PUCCH resource index, an index of a second physical resource block PRB on which a second PUCCH in the $(n+k)^{th}$ timeslot is located, and a second PUCCH resource on the second PRB.

Therefore, according to the method for determining a physical uplink control channel resource in this embodiment of the present invention, two physical uplink control channel resources can be allocated in one timeslot, thereby resolving a problem that one physical uplink control channel in one timeslot cannot carry all content.

It should be understood that in this embodiment of the present invention, a length of one timeslot may be a length oft single carrier frequency division multiple access (Single-carrier Frequency-Division Multiple Access, SC-FDMA) symbols, and t is a positive integer that is less than or equal to 7. For example, the length of one timeslot may be 0.5 ms or may be less than 0.5 ms. When the length of one timeslot is less than 0.5 ms, a TTI length is equal to the length of the timeslot.

Optionally, the UE 200 may further include: a sending unit, configured to send, after the first PUCCH resource and the second PUCCH resource are determined, the first PUCCH and the second PUCCH respectively on the first PUCCH resource and the second PUCCH resource in the $(n+k)^{th}$ timeslot. The first PUCCH and the second PUCCH include feedback information for a PDSCH in the $n^{th}$ timeslot, so that a network device determines, according to the feedback information, whether to retransmit downlink data.

Optionally, the receiving unit 210 is further configured to receive resource offset information, where the resource offset information is used to indicate offset information of a resource on which the second PUCCH in the $(n+k)^{th}$ timeslot is located. The processing unit 220 is specifically configured to determine the index of the second PRB and the second PUCCH resource according to the first PUCCH resource index and the resource offset information.

Optionally, the processing unit 220 is specifically configured to:

determine a relative offset of a second resource index according to the resource offset information, where the relative offset of the second resource index is an offset of a second PUCCH resource index relative to the first PUCCH resource index;

determine the second PUCCH resource index according to the first PUCCH resource index and the relative offset of the second resource index; and determine the index of the second PRB and the second PUCCH resource according to the second PUCCH resource index.

The processing unit 210 is specifically configured to:

when m mod 2=0, the second PUCCH resource index=the first PUCCH resource index+the relative offset of the second resource index; or when m mod 2=1, the second PUCCH resource index=the first PUCCH resource index−the relative offset of the second resource index, where m is the index of the first PRB, m is an integer that is greater than or equal to 0, m may be any integer in $\{0\sim N_{RB}^{UL}-1\}$, and $N_{RB}^{UL}$ is a quantity of uplink bandwidth resource blocks.

Optionally, the resource offset information may include a first relative offset and a second relative offset, the first relative offset is an offset of the index of the second PRB relative to the index of the first PRB, and the second relative offset is an offset of the second PUCCH resource relative to the first PUCCH resource.

Correspondingly, the receiving unit 210 is specifically configured to receive the first relative offset and the second relative offset. The processing unit 220 is specifically configured to determine the relative offset of the second resource index according to the first relative offset and the second relative offset.

The receiving unit 210 may be configured to receive the first relative offset by using higher layer signaling or a PDCCH/EPDCCH, and receive the second relative offset by using the PDCCH/EPDCCH.

The processing unit 220 may be specifically configured to determine the relative offset N of the second resource index according to the following formula:

$$N = i * c * N_{SC}^{RB} / \Delta_{shift}^{PUCCH} + j,$$

where i is the first relative offset, j is the second relative offset, c is a quantity of orthogonal sequences used within one PRB, $N_{SC}^{RB}$ is a quantity of subcarriers in a frequency domain within one PRB, and $\Delta_{shift}^{PUCCH}$ is a cyclic shift step of a PUCCH.

Alternatively, the resource offset information may include a first relative offset and the second PUCCH resource, and the first relative offset is an offset of the index of the second PRB relative to the index of the first PRB.

Correspondingly, the receiving unit 210 is specifically configured to receive the first relative offset and the second PUCCH resource. The determining unit 220 is specifically configured to determine the relative offset of the second resource index according to the first relative offset and the second PUCCH resource.

The receiving unit 210 may be configured to receive the first relative offset and the second PUCCH resource by using a PDCCH/EPDCCH.

The processing unit 220 is specifically configured to determine the relative offset N of the second resource index according to the following formula:

$$N = v * c * N_{SC}^{RB} / \Delta_{shift}^{PUCCH} + t,$$

where v is the first relative offset, t is the second PUCCH resource, c is a quantity of orthogonal sequences used within one PRB, $N_{SC}^{RB}$ is a quantity of subcarriers in a frequency domain within one PRB, $\Delta_{shift}^{PUCCH}$ is a cyclic shift step of a PUCCH, t is any integer in $\{0\sim c*N_{SC}^{RB}/\Delta_{shift}^{PUCCH}-1\}$, and v is an integer that is greater than or equal to 0.

Optionally, the determining unit 220 is specifically configured to:

determine, according to the first PUCCH resource index, an index of a first PRB on which the first PUCCH in the $(n+k)^{th}$ timeslot is located, and a first PUCCH resource of the first PUCCH on the first PRB;

determine the second PUCCH resource according to the first PUCCH resource, where the second PUCCH resource and the first PUCCH resource meet a preset relationship; and determine the index of the second PRB according to the index of the first PRB.

Optionally, the processing unit 220 may be specifically configured to:

when m mod 2=0, determine that the index of the second PRB is m+q; or when m mod 2=1, determine that the index of the second PRB is m−q, where m is the index of the first PRB, m is an integer that is greater than or equal to 0, q is any integer in $\{0\sim \lfloor N_{RB}^{UL}/2 \rfloor\}$, and $N_{RB}^{UL}$ is a quantity of uplink bandwidth resource blocks, m may be any integer in $\{0\sim N_{RB}^{UL}-1\}$, and $N_{RB}^{UL}$ is a quantity of uplink bandwidth resource blocks.

Optionally, when the first PUCCH and the second PUCCH are in a first PUCCH format, the index of the second PRB is identical to the index of the first PRB; or when the first PUCCH and the second PUCCH are in a second PUCCH format, there is an interval p between the index of the second PRB and the index of the first PRB, where p is any integer in $\{1\sim \lfloor N_{RB}^{UL}/2 \rfloor\}$ or $\{-N_{RB}^{UL}/2 \rfloor\sim-1\}$, and $N_{RB}^{UL}$ is a quantity of uplink bandwidth resource blocks.

Optionally, an index of a first PRB on which the first PUCCH is located is identical to the index of the second PRB.

Optionally, the processing unit 220 is further configured to: determine a number of the first PRB according to the index of the first PRB; and determine a number of the second PRB according to the index of the second PRB.

Optionally, the processing unit 220 is specifically configured to determine mist PRB, a number of the first PRB according to $m_1$ the index of the first PRB by using the following formula:

$$n_{first\ PRB} = \left\lfloor \frac{m_1}{2} \right\rfloor$$

The processing unit 220 is specifically configured to determine $n_{second\ PRB}$, the number of the second PRB according to $m_2$ the index of the second PRB by using the following formula:

$$n_{second\ PRB} = N_{RB}^{UL} - 1 - \left\lfloor \frac{m_2}{2} \right\rfloor,$$

where $N_{RB}^{UL}$ is a quantity of uplink bandwidth resource blocks.

Optionally, the processing unit 220 is further specifically configured to determine $n_{first\ PRB}$, a number of the first PRB according to $m_1$, the index of the first PRB by using the following formula:

$$n_{first\ PRB} = N_{RB}^{UL} - 1 - \left\lfloor \frac{m_1}{2} \right\rfloor$$

The processing unit 220 is further specifically configured to determine $n_{second\ PRB}$, the number of the first PRB according to $m_2$, the index of the second PRB by using the following formula:

$$n_{second\ PRB} = \left\lfloor \frac{m_2}{2} \right\rfloor,$$

where $N_{RB}^{UL}$ is a quantity of uplink bandwidth resource blocks.

As shown in FIG. 2, the UE 200 may further include a sending unit 230. The sending unit 230 is configured to send the first PUCCH and the second PUCCH, where information carried by the first PUCCH and information carried by the second PUCCH meet a preset relationship.

Figure 6:
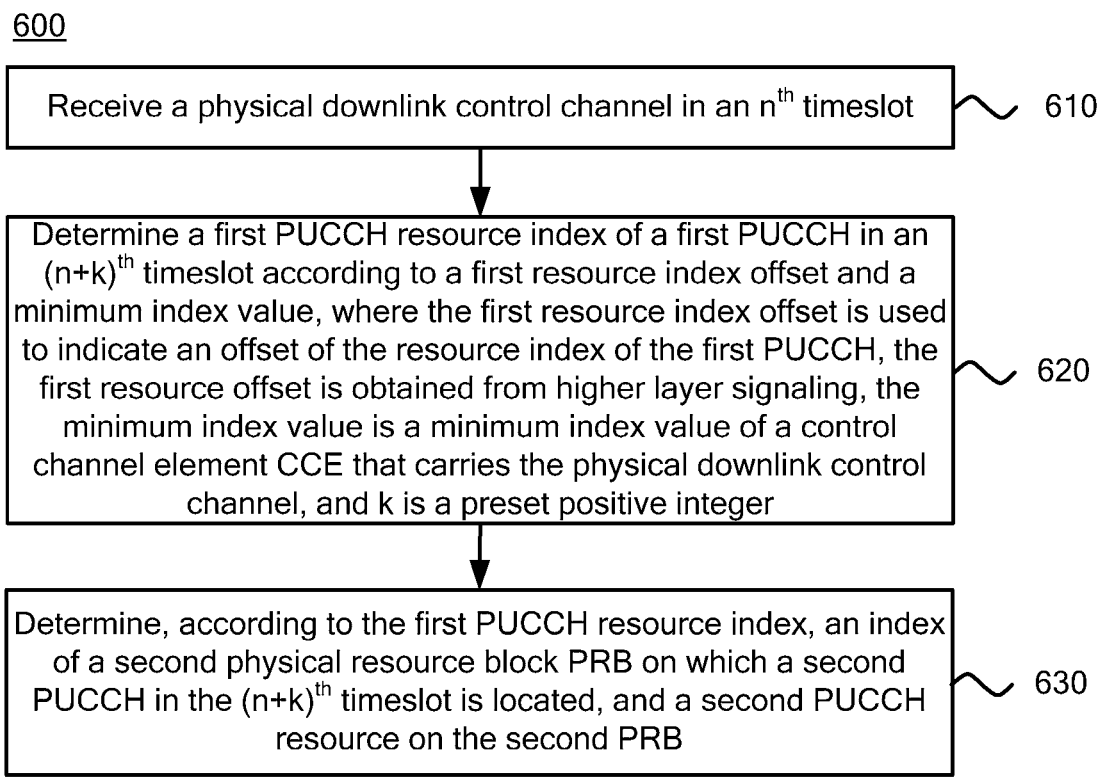
FIG. 6 is a schematic flowchart of a method for determining a physical uplink control channel resource according to an embodiment of the present invention.

It should be understood that the foregoing and other operations and/or functions of all modules in the UE 200 in this embodiment of the present invention are to implement separately a corresponding process of a method 600 in FIG. 6. Therefore, for specific functions and operations of the UE 200, reference may be made to the corresponding process of the method 600. Details are not described herein again.

Therefore, according to the apparatus for determining a physical uplink control channel resource in this embodiment of the present invention, two physical uplink control channel resources can be allocated in one timeslot, thereby resolving a problem that one physical uplink control channel in one timeslot cannot carry all content.

Figure 3:
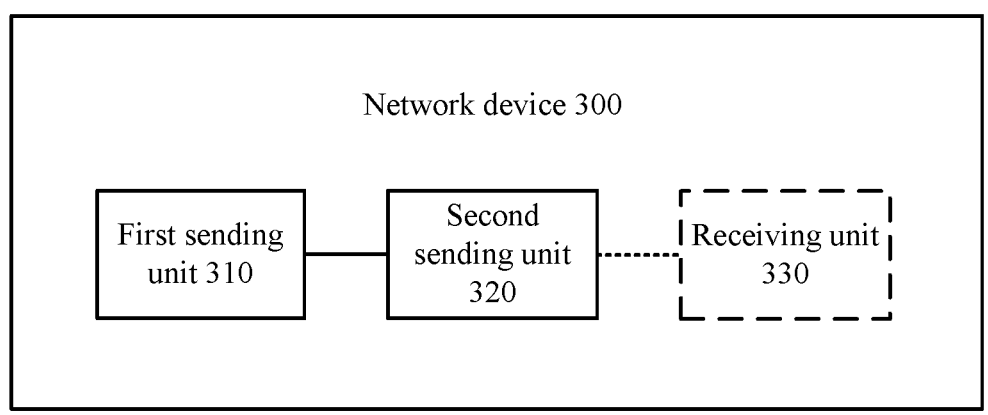
FIG. 3 is a schematic block diagram of a network device according to another embodiment of the present invention.

FIG. 3 is a network device according to an embodiment of the present invention. As shown in FIG. 3, the network device 300 includes a first sending unit 310 and a second sending unit 320.

The first sending unit 310 is configured to send a physical downlink control channel in an $n^{th}$ timeslot to a user UE, so that the UE determines, according to a first resource index offset, a first PUCCH resource index of a first PUCCH in an $(n+k)^{th}$ timeslot corresponding to the physical downlink control channel, where the first resource index offset is used to indicate an offset of the resource index of the first PUCCH.

The second sending unit 320 is configured to send resource offset information to the UE, where the resource offset information is used to indicate offset information of a resource on which a second PUCCH in the $(n+k)^{th}$ timeslot is located, so that the UE determines, according to the first PUCCH resource index and the resource offset information, an index of a second PRB on which the second PUCCH in the $(n+k)^{th}$ timeslot is located, and a second PUCCH resource of the second PUCCH on the second PRB.

Therefore, according to the apparatus for determining a physical uplink control channel resource in this embodiment of the present invention, two physical uplink control channel resources can be allocated in one timeslot, thereby resolving a problem that one physical uplink control channel in one timeslot cannot carry all content.

It should be understood that in this embodiment of the present invention, a length of one timeslot may be a length of t SC-FDMA symbols or t OFDM symbols, and t is a positive integer that is less than or equal to 7. For example, the length of one timeslot may be 0.5 ms or may be less than 0.5 ms. When the length of one timeslot is less than 0.5 ms, a TTI length is equal to the length of the timeslot.

Optionally, the network device 300 may further include: a third sending unit, configured to send the first resource index offset to the UE by using higher layer signaling.

Optionally, the resource offset information includes a first relative offset and a second relative offset, the first relative offset is an offset of the index of the second PRB relative to the index of the first PRB, and the second relative offset is an offset of the second PUCCH resource relative to the first PUCCH resource.

Correspondingly, the second sending unit 320 is specifically configured to send the first relative offset and the second relative offset to the UE.

The second sending unit 320 may send the first relative offset by using higher layer signaling or a PDCCH/EPDCCH to the UE, and send the second relative offset by using the PDCCH/EPDCCH to the UE.

Alternatively, the resource offset information includes a first relative offset and the second PUCCH resource, and the first relative offset is an offset of the index of the second PRB relative to the index of the first PRB.

Correspondingly, the second sending unit 320 is specifically configured to send the first relative offset and the second PUCCH resource to the UE.

The second sending unit 320 may send the first relative offset and the second PUCCH resource to the UE by using a PDCCH/EPDCCH.

Optionally, as shown in FIG. 3, the network device 300 may further include: a receiving unit 330, configured to receive the first PUCCH and the second PUCCH in the $(n+k)^{th}$ timeslot.

The first PUCCH and the second PUCCH include feedback information of a PDSCH in the $n^{th}$ timeslot. The network device 300 may determine, according to the feedback information, whether to retransmit uplink data.

Optionally, information carried by the first PUCCH and information carried by the second PUCCH meet a preset condition.

It should be understood that the foregoing and other operations and/or functions of all modules in the network device 300 in this embodiment of the present invention are to implement separately a corresponding process of a method 700 in FIG. 7. Therefore, for specific functions and operations of the network device 300, reference may be made to the corresponding process of the method 700. Details are not described herein again.

Therefore, according to the apparatus for determining a physical uplink control channel resource in this embodiment of the present invention, two physical uplink control channel resources can be allocated in one timeslot, thereby resolving a problem that one physical uplink control channel in one timeslot cannot carry all content.

Figure 4:
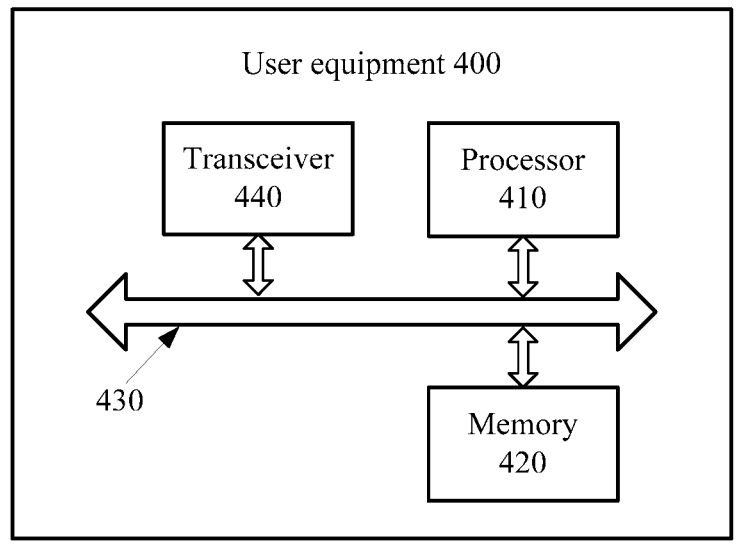
FIG. 4 is a schematic block diagram of user equipment according to another embodiment of the present invention.

FIG. 4 is a schematic block diagram of UE according to another embodiment of the present invention. As shown in FIG. 4, the UE 400 includes a processor 410, a memory 420, a bus system 430, and a transceiver 440. The processor 410, the memory 420, and the transmitter 450 are connected by using the bus system 430, the memory 420 is configured to store an instruction, and the processor 410 is configured to execute the instruction stored in the memory 420.

The transceiver 440 is configured to receive a physical downlink control channel in an $n^{th}$ timeslot.

The processor 410 is configured to determine a first PUCCH resource index of a first PUCCH in an $(n+k)^{th}$ timeslot according to a first resource index offset and a minimum index value, where the first resource index offset is used to indicate an offset of the resource index of the first PUCCH, the first resource index offset is obtained from higher layer signaling, the minimum index value is a minimum index value of a control channel element that carries the physical downlink control channel, and k is a preset positive integer.

It should be understood that an index of a first PRB on which the first PUCCH is located and a first PUCCH resource on the first PRB may be determined according to the first PUCCH resource index and a preset mapping relationship.

The processor 410 is further configured to determine, according to the first PUCCH resource index, an index of a second physical resource block PRB on which a second PUCCH in the $(n+k)^{th}$ timeslot is located, and a second PUCCH resource on the second PRB.

Therefore, according to the apparatus for determining a physical uplink control channel resource in this embodiment of the present invention, two physical uplink control channel resources can be allocated in one timeslot, thereby resolving a problem that one physical uplink control channel in one timeslot cannot carry all content.

It should be understood that in this embodiment of the present invention, the processor 410 may be a central processing unit (Central Processing Unit, CPU), or the processor 410 may be another general purpose processor, a digital signal processor (DSP), an application specific integrated circuit (ASIC), a field programmable gate array (FPGA) or another programmable logic device, a discrete gate or a transistor logic device, a discrete hardware component, or the like. The general purpose processor may be a microprocessor, or the processor may be any conventional processor or the like.

The memory 420 may include a read-only memory and a random access memory, and provide an instruction and data for the processor 410. A part of the memory 420 may further include a non-volatile random access memory. For example, the memory 420 may further store information about a device type.

The bus system 430 may include not only a data bus but also a power supply bus, a control bus, and a status signal bus. However, for clear description, all buses in the figure are marked as the bus system 430.

In an implementation process, the steps of the foregoing method may be implemented by using an integrated logical circuit of hardware in the processor 410, or by using a software instruction. The steps of the method disclosed with reference to this embodiment of the present invention may be directly implemented by a hardware processor, or may be implemented by a combination of hardware and a software module in a processor. The software module may be in a random access memory, a flash memory, a read-only memory, a programmable read-only memory or an erasable programmable memory, a register, or another mature storage medium in the art. The storage medium is located in the memory 420, and the processor 410 reads information in the memory 420 and implements, in combination with its hardware, the steps of the foregoing method. To avoid repetition, no detailed description is given herein again.

It should be understood that in this embodiment of the present invention, a length of one timeslot may be a length of t SC-FDMA symbols or t OFDM symbols, and t is a positive integer that is less than or equal to 7. For example, the length of one timeslot may be 0.5 ms or may be less than 0.5 ms. When the length of one timeslot is less than 0.5 ms, a TTI length is equal to the length of the timeslot.

Optionally, the transceiver 440 may be further configured to send, after the first PUCCH resource and the second PUCCH resource are determined, the first PUCCH and the second PUCCH respectively on the first PUCCH resource and the second PUCCH resource in the $(n+k)^{th}$ timeslot. The first PUCCH and the second PUCCH include feedback information for a PDSCH in the $n^{th}$ timeslot, so that an eNB determines, according to the feedback information, whether to retransmit downlink data.

Optionally, the transceiver 440 is further configured to receive resource offset information, where the resource offset information is used to indicate offset information of a resource on which the second PUCCH in the $(n+k)^{th}$ timeslot is located. Correspondingly, the processor 410 is specifically configured to determine the index of the second PRB and the second PUCCH resource according to the first PUCCH resource index and the resource offset information.

Optionally, the processor 410 is specifically configured to:

determine a relative offset of a second resource index according to the resource offset information, where the relative offset of the second resource index is an offset of a second PUCCH resource index relative to the first PUCCH resource index;

determine the second PUCCH resource index according to the first PUCCH resource index and the relative offset of the second resource index; and determine the index of the second PRB and the second PUCCH resource according to the second PUCCH resource index.

Optionally, the processor 410 is specifically configured to:

when m mod 2=0, the second PUCCH resource index=the first PUCCH resource index+the relative offset of the second resource index; or when m mod 2=1, the second PUCCH resource index=the first PUCCH resource index−the relative offset of the second resource index, where m is an index of a first PRB, m is an integer that is greater than or equal to 0, m may be any integer in $\{0 \sim N_{RB}^{UL}-1\}$, and $N_{RB}^{UL}$ is a quantity of uplink bandwidth resource blocks.

Optionally, the resource offset information includes a first relative offset and a second relative offset, the first relative offset is an offset of the index of the second PRB relative to the index of the first PRB, and the second relative offset is an offset of the second PUCCH resource relative to the first PUCCH resource.

Correspondingly, the transceiver 440 is specifically configured to receive the first relative offset and the second relative offset. The processor 410 is specifically configured to determine the relative offset of the second resource index according to the first relative offset and the second relative offset.

The processor 410 may be specifically configured to determine the relative offset N of the second resource index according to the following formula:

$$N = i * c * N_{SC}^{RB} / \Delta_{shift}^{PUCCH} + j,$$

where i is the first relative offset, j is the second relative offset, c is a quantity of orthogonal sequences used within one PRB, $N_{SC}^{RB}$ is a quantity of subcarriers in a frequency domain within one PRB, and $\Delta_{shift}^{PUCCH}$ is a cyclic shift step of a PUCCH.

Alternatively, the resource offset information may include a first relative offset and the second PUCCH resource, and the first relative offset is an offset of the index of the second PRB relative to the index of the first PRB.

Correspondingly, the transceiver 440 is specifically configured to receive the first relative offset and the second PUCCH resource. The processor 410 is specifically configured to determine the relative offset of the second resource index according to the first relative offset and the second PUCCH resource.

The processor 410 is specifically configured to determine the relative offset N of the second resource index according to the following formula:

$$N = v * c * N_{SC}^{RB} / \Delta_{shift}^{PUCCH} + t,$$

where v is the first relative offset, t is the second PUCCH resource, c is a quantity of orthogonal sequences used within one PRB, $N_{SC}^{RB}$ is a quantity of subcarriers in a frequency domain within one PRB, $\Delta_{shift}^{PUCCH}$ is a cyclic shift step of a PUCCH, t is any integer in $\{0 \sim c * N_{SC}^{RB} / \Delta_{shift}^{PUCCH} - 1\}$, and v is an integer that is greater than or equal to 0.

Optionally, the processor 410 may be further configured to:

determine, according to the first PUCCH resource index, an index of a first PRB on which the first PUCCH in the $(n+k)^{th}$ timeslot is located, and a first PUCCH resource of the first PUCCH on the first PRB;

determine the second PUCCH resource according to the first PUCCH resource, where the second PUCCH resource and the first PUCCH resource meet a preset relationship; and determine the index of the second PRB according to the index of the first PRB.

Optionally, the processor 410 is specifically configured to:
when m mod 2=0, determine that the index of the second PRB is m+q; or
when m mod 2=1, determine that the index of the second PRB is m−q, where
m is the index of the first PRB, m is an integer that is greater than or equal to 0, q is any integer in $\{0 \sim \lfloor N_{RB}^{UL}/2 \rfloor\}$, m may be any integer in $\{0 \sim N_{RB}^{UL} - 1\}$, and $N_{RB}^{UL}$ is a quantity of uplink bandwidth resource blocks.

Optionally, when the first PUCCH and the second PUCCH are in a first PUCCH format, the index of the second PRB is identical to the index of the first PRB; or when the first PUCCH and the second PUCCH are in a second PUCCH format, there is an interval p between the index of the second PRB and the index of the first PRB, where p is any integer in $\{1 \sim \lfloor N_{RB}^{UL}/2 \rfloor\}$ or $\{-\lfloor N_{RB}^{UL}/2 \rfloor \sim -1\}$, and $N_{RB}^{UL}$ is a quantity of uplink bandwidth resource blocks.

Optionally, an index of a first PRB on which the first PUCCH is located is identical to the index of the second PRB.

Optionally, the processor 410 is further configured to: determine a number of the first PRB according to the index of the first PRB; and determine a number of the second PRB according to the index of the second PRB.

Optionally, the processor 410 is specifically configured to determine $n_{first\ PRB}$, a number of the first PRB according to $m_1$, the index of the first PRB by using the following formula:

$$n_{first\ PRB} = \left\lfloor \frac{m_1}{2} \right\rfloor$$

The processor 410 is specifically configured to determine $n_{second\ PRB}$, a number of the second PRB according to $m_2$, the index of the second PRB by using the following formula:

$$n_{second\ PRB} = N_{RB}^{UL} - 1 - \left\lfloor \frac{m_2}{2} \right\rfloor,$$

where $N_{RB}^{UL}$ is a quantity of uplink bandwidth resource blocks.

Optionally, the processor 410 is further specifically configured to determine mist PRB, a number of the first PRB according to $m_1$ the index of the first PRB by using the following formula:

$$n_{first\ PRB} = N_{RB}^{UL} - 1 - \left\lfloor \frac{m_1}{2} \right\rfloor$$

The processor 410 is further specifically configured to determine $n_{second\ PRB}$, the number of the first PRB according to $m_2$, the index of the second PRB by using the following formula:

$$n_{second\ PRB} = \left\lfloor \frac{m_2}{2} \right\rfloor,$$

where $N_{RB}^{UL}$ is a quantity of uplink bandwidth resource blocks.

Optionally, the transceiver 440 is further configured to send the first PUCCH and the second PUCCH, where information carried by the first PUCCH and information carried by the second PUCCH meet a preset relationship.

It should be understood that, the UE 400 according to this embodiment of the present invention may correspond to the UE 200 in the embodiment of the present invention, and the foregoing and other operations and/or functions of all modules in the UE 400 are to implement separately a corresponding process of a method 600 in FIG. 6. For brevity, details are not described herein again.

Therefore, according to the apparatus for determining a physical uplink control channel resource in this embodiment of the present invention, two physical uplink control channel resources can be allocated in one timeslot, thereby resolving a problem that one physical uplink control channel in one timeslot cannot carry all content.

Figure 5:
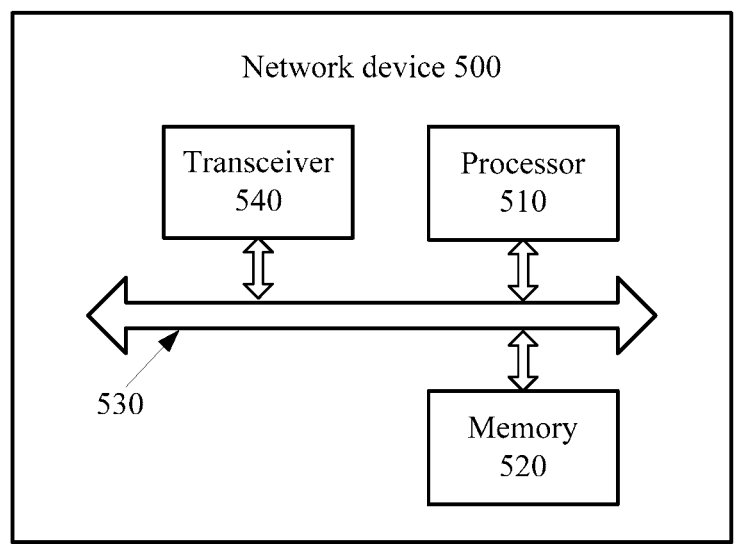
FIG. 5 is a schematic block diagram of a network device according to another embodiment of the present invention.

FIG. 5 is a schematic block diagram of a network device according to another embodiment of the present invention. As shown in FIG. 5, the network device 500 includes a processor 510, a memory 520, a bus system 530, and a transceiver 540. The processor 510, the memory 520, and the transmitter 550 are connected by using the bus system 530, the memory 520 is configured to store an instruction, and the processor 510 is configured to execute the instruction stored in the memory 520.

The transceiver 540 is configured to send a physical downlink control channel in an $n^{th}$ timeslot to a user UE, so that the UE determines, according to a first resource index offset, a first PUCCH resource index of a first PUCCH in an $(n+k)^{th}$ timeslot corresponding to the physical downlink control channel, where the first resource index offset is used to indicate an offset of the resource index of the first PUCCH.

The transceiver 540 is further configured to send resource offset information to the UE, where the resource offset information is used to indicate offset information of a resource on which a second PUCCH in the $(n+k)^{th}$ timeslot is located, so that the UE determines, according to the first PUCCH resource index and the resource offset information, an index of a second PRB on which the second PUCCH in the $(n+k)^{th}$ timeslot is located, and a second PUCCH resource of the second PUCCH on the second PRB.

Therefore, according to the apparatus for determining a physical uplink control channel resource in this embodiment of the present invention, two physical uplink control channel resources can be allocated in one timeslot, thereby resolving a problem that one physical uplink control channel in one timeslot cannot carry all content.

It should be understood that in this embodiment of the present invention, the processor 510 may be a central processing unit (Central Processing Unit, CPU), or the processor 510 may be another general purpose processor, a digital signal processor (DSP), an application specific integrated circuit (ASIC), a field programmable gate array (FPGA) or another programmable logic device, a discrete gate or a transistor logic device, a discrete hardware component, or the like. The general purpose processor may be a microprocessor, or the processor may be any conventional processor or the like.

The memory 520 may include a read-only memory and a random access memory, and provide an instruction and data for the processor 510. A part of the memory 520 may further include a non-volatile random access memory. For example, the memory 520 may further store information about a device type.

The bus system 530 may include not only a data bus but also a power supply bus, a control bus, and a status signal bus. However, for clear description, all buses in the figure are marked as the bus system 530.

In an implementation process, the steps of the foregoing method may be implemented by using an integrated logical circuit of hardware in the processor 510, or by using a software instruction. The steps of the method disclosed with reference to this embodiment of the present invention may be directly implemented by a hardware processor, or may be implemented by a combination of hardware and a software module in a processor. The software module may be in a random access memory, a flash memory, a read-only memory, a programmable read-only memory or an erasable programmable memory, a register, or another mature storage medium in the art. The storage medium is located in the memory 520, and the processor 510 reads information in the memory 520 and implements, in combination with its hardware, the steps of the foregoing method. To avoid repetition, no detailed description is given herein again.

It should be understood that in this embodiment of the present invention, a length of one timeslot may be a length of t SC-FDMA symbols or t OFDM symbols, and t is a positive integer that is less than or equal to 7. For example, the length of one timeslot may be 0.5 ms or may be less than 0.5 ms. When the length of one timeslot is less than 0.5 ms, a TTI length is equal to the length of the timeslot.

Optionally, the transceiver 540 is further configured to send the first resource index offset to the UE by using higher layer signaling.

Optionally, the resource offset information includes a first relative offset and a second relative offset, the first relative offset is an offset of the index of the second PRB relative to the index of the first PRB, and the second relative offset is an offset of the second PUCCH resource relative to the first PUCCH resource.

Correspondingly, the transceiver 540 is specifically configured to send the first relative offset and the second relative offset to the UE.

Optionally, the resource offset information may include a first relative offset and the second PUCCH resource, and the first relative offset is an offset of the index of the second PRB relative to the index of the first PRB.

Correspondingly, the transceiver 540 is specifically configured to send the first relative offset and the second PUCCH resource to the UE.

Optionally, the transceiver 540 is further configured to receive the first PUCCH and the second PUCCH, where information carried by the first PUCCH and information carried by the second PUCCH meet a preset relationship.

It should be understood that, the network device 500 according to this embodiment of the present invention may correspond to the network device 300 in the embodiment of the present invention, and the foregoing and other operations and/or functions of all modules in the network device 500 are to implement separately a corresponding process of a method 700 in FIG. 7. For brevity, details are not described herein again.

Therefore, according to the apparatus for determining a physical uplink control channel resource in this embodiment of the present invention, two physical uplink control channel resources can be allocated in one timeslot, thereby resolving a problem that one physical uplink control channel in one timeslot cannot carry all content.

With reference to FIG. 2 and FIG. 5, the foregoing describes in detail the UE and the network device according to the embodiments of the present invention. With reference to FIG. 6 and FIG. 7, the following describes a method for determining a physical uplink control channel resource according to the embodiments of the present invention.

FIG. 6 is a schematic flowchart of a method 600 for determining a physical uplink control channel PUCCH resource according to an embodiment of the present invention. The method 600 may be implemented by user equipment. As shown in FIG. 6, the method 600 includes the following steps.

610: Receive a physical downlink control channel in an $n^{th}$ timeslot.

It should be understood that the physical downlink control channel herein may be a PDCCH or may be an enhanced physical downlink control channel (Enhanced Physical downlink Control Channel, EPDCCH).

620: Determine a first PUCCH resource index of a first PUCCH in an $(n+k)^{th}$ timeslot according to a first resource index offset and a minimum index value, where the first resource index offset is used to indicate an offset of the resource index of the first PUCCH, the first resource index offset is obtained from higher layer signaling, the minimum index value is a minimum index value of a control channel element CCE that carries the physical downlink control channel, and k is a preset positive integer.

For example, if a PDCCH/EPDCCH is carried on CCE/ECCE 0, CCE/ECCE 2, CCE/ECCE 4, and CCE/ECCE 8, an index value 0 is the minimum index value of the CCE/ECCE of the PDCCH/EPDCCH.

For example, when the physical downlink control channel is a PDCCH, the first PUCCH resource index $n_{PUCCH}=n_{CCE}+N_{PUCCH}^{(1)}$, where $n_{CCE}$ is the minimum index value of the CCE, and $N_{PUCCH}^{(1)}$ is the first resource index offset.

It should be noted that, when multiple antenna ports are configured, the first PUCCH resource index also needs to be determined according to the antenna ports. For example, when two antenna ports $p_0$ and $p_1$ are configured, the first PUCCH resource index on a first antenna port $n_{PUCCH}^{(1,\tilde{p}0)}=n_{CCE}+N_{PUCCH}^{(1)}$, and the first PUCCH resource index on a second antenna port $n_{PUCCH}^{(1,\tilde{p}1)}=n_{CCE}+N_{PUCCH}^{(1)}$.

When the physical downlink control channel is an EPDCCH, the first PUCCH resource index also needs to be determined according to a HARQ-ACK resource offset $\Delta^{ARO}$. The first PUCCH resource index $n_{PUCCH}=n_{ECCE,q}+\Delta_{ARO}+N_{PUCCH,q}^{(e1)}$, where $n_{ECCE,q}$ is the minimum index value of the ECCE, and $N_{PUCCH,q}^{(1)}$ is the first resource index offset.

Similarly, when multiple antenna ports are configured, the first PUCCH resource index also needs to be determined according to the antenna ports. For example, when two antenna ports $p_0$ and $p_1$ are configured, the first PUCCH resource index on a first antenna port $n_{PUCCH}^{(1,\tilde{p}0)}=n_{CCE}+\Delta_{ARO}+N_{PUCCH}^{(e1)}$, and the first PUCCH resource index on a second antenna port $n_{PUCCH}^{(1,\tilde{p}1)}=n_{ECCE,q}+1+\Delta_{ARO}+N_{PUCCH}^{(e1)}$.

It should be understood that, after the first PUCCH resource index is determined, an index of a PRB on which the first PUCCH is located and a PUCCH resource of the first PUCCH in the PRB can be determined according to a predefined mapping relationship.

630: Determine, according to the first PUCCH resource index, an index of a second physical resource block PRB on which a second PUCCH in the (n+k)$^{th}$ timeslot is located, and a second PUCCH resource on the second PRB.

Therefore, according to the method for determining a physical uplink control channel resource in this embodiment of the present invention, two physical uplink control channel resources can be allocated in one timeslot, thereby resolving a problem that one physical uplink control channel in one timeslot cannot carry all content.

It should be understood that in this embodiment of the present invention, a length of one timeslot may be a length of t SC-FDMA symbols or t OFDM symbols, and t is a positive integer that is less than or equal to 7. For example, the length of one timeslot may be 0.5 ms or may be less than 0.5 ms. When the length of one timeslot is less than 0.5 ms, a TTI length is equal to the length of the timeslot. For example, the TTI length is one SC-FDMA symbol, two SC-FDMA symbols, three SC-FDMA symbols, four SC-FDMA symbols, five SC-FDMA symbols, six SC-FDMA symbols, seven SC-FDMA symbols, one OFDM symbol, two OFDM symbols, three OFDM symbols, four OFDM symbols, five OFDM symbols, six OFDM symbols, or seven OFDM symbols. For another example, the TTI length may be 0.5 ms, 0.125 ms, or 0.1 ms.

After the first PUCCH resource and the second PUCCH resource are determined, the first PUCCH and the second PUCCH may be sent respectively on the first PUCCH resource and the second PUCCH resource in the (n+k)$^{th}$ timeslot. The first PUCCH and the second PUCCH include feedback information for a PDSCH in the n$^{th}$ timeslot, so that a network device determines, according to the feedback information, whether to retransmit downlink data. The feedback information may include a hybrid automatic repeat request (Hybrid Automatic Repeat request, HARQ for short).

Optionally, the first PUCCH and the second PUCCH may further carry uplink control information. The uplink control information may include at least one type of information: feedback information for the PDSCH in the n$^{th}$ timeslot, channel state information (Channel State Information, CSI for short) of a downlink channel, or a scheduling request (Scheduling Request, SR for short), so that a network device determines, according to the uplink control information, whether to retransmit downlink data and/or whether to perform scheduling.

It should be noted that, that the first PUCCH and the second PUCCH include feedback information for a PDSCH in the n$^{th}$ timeslot may be equivalent to that the first PUCCH and the second PUCCH carry feedback information for a PDSCH in the n$^{th}$ timeslot.

Optionally, the method 600 may further include: receiving resource offset information, where the resource offset information is used to indicate offset information of a resource on which the second PUCCH in the (n+k)$^{th}$ timeslot is located.

Correspondingly, the step 630 may include: determining the index of the second PRB and the second PUCCH resource according to the first PUCCH resource index and the resource offset information.

The resource offset information may be carried on higher layer signaling or may be carried on a PDCCH/EPDCCH.

Specifically, the determining the index of the second PRB and the second PUCCH resource according to the first PUCCH resource index and the resource offset information includes:

determining a relative offset of a second resource index according to the resource offset information, where the relative offset of the second resource index is an offset of a second PUCCH resource index relative to the first PUCCH resource index;

determining the second PUCCH resource index according to the first PUCCH resource index and the relative offset of the second resource index; and determining the index of the second PRB and the second PUCCH resource according to the second PUCCH resource index.

The determining the second PUCCH resource index according to the first PUCCH resource index and the relative offset of the second resource index includes:

when m mod 2=0, the second PUCCH resource index=the first PUCCH resource index+the relative offset of the second resource index; or when m mod 2=1, the second PUCCH resource index=the first PUCCH resource index−the relative offset of the second resource index, where m is an index of a first PRB, and m is an integer that is greater than or equal to 0, mod is a remainder operator, indicating calculating a remainder, m may be any integer in $\{0\sim N_{RB}^{UL}-1\}$, and $N_{RB}^{UL}$ is a quantity of uplink bandwidth resource blocks.

It should be noted that m, the index of the first PRB in this embodiment of the present invention is used to indicate a PRB on which the first PUCCH is located, that is, there is a predefined mapping relationship between the index of the first PRB and $n_{PRB}$, a number of the first PRB on which the first PUCCH is located.

For example, m, the index of the first PRB, and $n_{PRB}$, the number of the first PRB may meet the mapping relationship represented by the following formula:

$$n_{PRB} = \begin{cases} \left\lfloor \dfrac{m}{2} \right\rfloor & \text{if } (m+n_s \bmod 2) \bmod 2 = 0 \\ N_{RB}^{UL} - 1 - \left\lfloor \dfrac{m}{2} \right\rfloor & \text{if } (m+n_s \bmod 2) \bmod 2 = 1 \end{cases},$$

where $n_s$ is a timeslot number, and a value range may be {0-19}.

Optionally, the resource offset information may include a first relative offset and a second relative offset, the first relative offset is an offset of the index of the second PRB relative to the index of the first PRB, and the second relative offset is an offset of the second PUCCH resource relative to the first PUCCH resource.

Correspondingly, the receiving resource offset information includes: receiving the first relative offset and the second relative offset. The determining a relative offset of a second resource index according to the resource offset information includes: determining the relative offset of the second resource index according to the first relative offset and the second relative offset.

The first relative offset may be received by using higher layer signaling or a PDCCH/EPDCCH, and the second relative offset may be received by using the PDCCH/EPDCCH.

Specifically, the relative offset N of the second resource index may be determined according to the following formula:

$$N = i * c * N_{SC}^{RB}/\Delta_{shift}^{PUCCH} + j, \qquad (1)$$

where i is the first relative offset, j is the second relative offset, c is a quantity of orthogonal sequences used within one PRB, $N_{SC}^{RB}$ is a quantity of subcarriers in a frequency domain within one PRB, and $\Delta_{shift}^{PUCCH}$ is a cyclic shift step of a PUCCH.

Specifically, if the second relative offset j is received by using a PDCCH, the PDCCH carries the second relative offset j. If the second relative offset j is received by using an EPDCCH, the EPDCCH carries not only a HARQ-ACK resource offset $\Delta_{ARO}$ but also the second relative offset j.

For example, the second relative offset j may be 2-bit (bit) information. The following table shows an example of the first relative offset and the second relative offset.

| Second relative offset | j |
|---|---|
| 0 | 0 |
| 1 | −1 |
| 2 | −2 |
| 3 | 2 |

Alternatively, the resource offset information may further include a first relative offset and the second PUCCH resource, and the first relative offset is an offset of the index of the second PRB relative to the index of the first PRB.

Correspondingly, the receiving resource offset information includes: receiving the first relative offset and the second PUCCH resource. The determining a relative offset of a second resource index according to the resource offset information includes: determining the relative offset of the second resource index according to the first relative offset and the second PUCCH resource.

The first relative offset and the second PUCCH resource may be received by using a PDCCH/EPDCCH.

Specifically, the relative offset N of the second resource index may be determined according to the following formula:

$$N = v * c * N_{SC}^{RB}/\Delta_{shift}^{PUCCH} + t, \qquad (2)$$

where v is the first relative offset, t is the second PUCCH resource, c is a quantity of orthogonal sequences used within one PRB, $N_{SC}^{RB}$ is a quantity of subcarriers in a frequency domain within one PRB, $\Delta_{shift}^{PUCCH}$ is a cyclic shift step of a PUCCH, t is any integer in $\{0 \sim c * N_{SC}^{RB}/\Delta_{shift}^{PUCCH} - 1\}$, and v is an integer that is greater than or equal to 0.

Correspondingly, the step 630 may include:

determining, according to the first PUCCH resource index, an index of a first PRB on which the first PUCCH in the $(n+k)^{th}$ timeslot is located, and a first PUCCH resource of the first PUCCH on the first PRB;

determining the second PUCCH resource according to the first PUCCH resource, where the second PUCCH resource and the first PUCCH resource meet a preset relationship; and determining the index of the second PRB according to the index of the first PRB.

It should be understood that the preset relationship that the second PUCCH resource and the first PUCCH resource meet may be predefined by UE and an eNB, or may be delivered by the eNB to the UE. For example, the method 600 may further include: receiving indication information, where the indication information is used to indicate the preset relationship that the second PUCCH resource and the first PUCCH resource meet. The preset relationship that the second PUCCH resource and the first PUCCH resource meet may be that the second PUCCH resource is identical to the first PUCCH resource.

The determining the index of the second PRB according to the index of the first PRB includes:

when m mod 2=0, determining that the index of the second PRB is m+q; or when m mod 2=1, determining that the index of the second PRB is m−q, where m is the index of the first PRB, m is an integer that is greater than or equal to 0, q is any integer in $$\left\{0 \sim \dfrac{N_{RB}^{UL}}{2}\right\},$$

and m may be any integer in $\{0 \sim N_{RB}^{UL} - 1\}$.

$N_{RB}^{UL}$ is a quantity of uplink bandwidth resource blocks. It should be noted that the quantity of uplink bandwidth resource blocks may be a quantity of system uplink bandwidth resource blocks or a quantity of uplink bandwidth resource blocks that are configured for a preset TTI. This is not limited in this embodiment of the present invention and may be set according to service requirements. For example, if $N_{RB}^{UL}$ indicates a quantity of system uplink bandwidth resource blocks. When the quantity of uplink bandwidth resource blocks is 110, a maximum value of q is 55. For another example, if $N_{RB}^{UL}$ indicates a quantity of uplink bandwidth resource blocks that are configured for a TTI, assuming that the quantity of uplink bandwidth resource blocks on an entire system is 110 and the quantity of uplink bandwidth resource blocks that are configured for a preset TTI is 50, a maximum value of q is 25.

Optionally, when the first PUCCH and the second PUCCH are in a first PUCCH format, the index of the second PRB is identical to the index of the first PRB; or when the first PUCCH and the second PUCCH are in a second PUCCH format, there is an interval p between the index of the second PRB and the index of the first PRB, where p is any integer in $\{1 \sim \lfloor N_{RB}^{UL}/2 \rfloor\}$ or $\{-N_{RB}^{UL}/2 \rfloor \sim -1\}$, and $N_{RB}^{UL}$ is a quantity of uplink bandwidth resource blocks.

When the first PUCCH and the second PUCCH are in the second PUCCH format, if the index of the first PRB is m, the index of the second PRB is m+p. For example, when m mod 2=0, p is any integer in $\{1 \sim \lfloor N_{RB}^{UL}/2 \rfloor\}$; or when m mod 2=1, p is any integer in $\{-\lfloor N_{RB}^{UL}/2 \rfloor \sim -1\}$.

For example, the second PUCCH format is PUCCH format 1a or PUCCH format 1b, that is, resources corresponding to these PUCCH formats are determined according to an implicit indication of an (E)CCE. The first PUCCH format may be another format, for example, PUCCH format 1, PUCCH format 2, PUCCH format 2a, PUCCH format 2b, PUCCH format 3, or PUCCH format 4. That is, resources corresponding to these PUCCH formats are configured by using higher layer signaling. The higher layer signaling herein may be radio resource control (Radio Resource Control, RRC for short), media access control (Media Access Control, MAC for short), or like signaling.

A physical meaning of the index of the second PRB is identical to a physical meaning of the index of the first PRB, and there is a predefined mapping relationship between the index of the second PRB and $n_{PRB}$. Details are not described herein again.

It should be noted that a PRB in this embodiment of the present invention is only a division manner for resources, a definition of a PRB in this embodiment of the present invention is not limited to a definition in a current LTE system, and the PRB in this embodiment of the present invention is described only by using an example of division for resources in the existing LTE system. For example, currently, it is defined that in the LTE system, one PRB includes 12 contiguous subcarriers in a frequency domain and includes 6 or 7 contiguous OFDM symbols in a time domain. However, this embodiment of the present invention is not limited thereto. This embodiment of the present invention may be further applied to a physical resource block defined otherwise. For example, the PRB in this embodiment of the present invention may include another quantity of subcarriers in the frequency domain, and/or include another quantity of OFDM symbols in the time domain. All these variations fall within the scope of this embodiment of the present invention.

It should be also noted that in this embodiment of the present invention, each parameter in formula (1) and formula (2) is not limited to the definition in the current LTE system. For example, c may be 2 or 3, or may be a number that is equal to or less than 1; $N_{SC}^{RB}$ may be 12 or may be another value, for example, equal to 6 or greater than 12; and $\Delta_{shift}^{PUCCH}$ may be 1, 2, or 3, or may be greater than 3.

Optionally, the index of the first PRB is identical to the index of the second PRB.

It should be noted that the index of the first PRB is identical to the index of the second PRB but a number of the first PRB may be different from a number of the second PRB.

Optionally, the method 600 may further include: determining a number of the first PRB according to the index of the first PRB; and determining a number of the second PRB according to the index of the second PRB.

Optionally, the determining a number of the first PRB according to the index of the first PRB includes: determining $n_{first\ PRB}$, the number of the first PRB according to $m_1$ the index of the first PRB by using the following formula (3):

$$n_{first\ PRB} = \left\lfloor \frac{m_1}{2} \right\rfloor \quad (3)$$

The determining a number of the second PRB according to the index of the second PRB includes: determining $n_{second\ PRB}$, the number of the second PRB according to $m_2$ the index of the second PRB by using the following formula (4):

$$n_{second\ PRB} = N_{RB}^{UL} - 1 - \left\lfloor \frac{m_2}{2} \right\rfloor, \quad (4)$$

where $m_1 = m_2$, and $N_{RB}^{UL}$ is a quantity of uplink bandwidth resource blocks.

Alternatively, the determining a number of the first PRB according to the index of the first PRB includes: determining $n_{first\ PRB}$, the number of the first PRB according to $m_1$, the index of the first PRB by using the following formula (5):

$$n_{first\ PRB} = N_{RB}^{UL} - 1 - \left\lfloor \frac{m_1}{2} \right\rfloor \quad (5)$$

The determining a number of the second PRB according to the index of the second PRB includes: determining $n_{second\ PRB}$, the number of the second PRB according to $m_2$ the index of the second PRB by using the following formula (6):

$$n_{second\ PRB} = \left\lfloor \frac{m_2}{2} \right\rfloor, \quad (6)$$

where $N_{RB}^{UL}$ is a quantity of uplink bandwidth resource blocks.

It should be noted that the first PUCCH resource index and the second PUCCH resource index are determined according to formulas (3) and (4) or formulas (5) and (6), or the first PUCCH resource index and the second PUCCH resource index are determined by using formulas (3) and (4) or formulas (5) and (6) according to a value of $n_s$.

For example, when $n_s$ mod 2=0, the first PUCCH resource index $n_{first\ PRB}$ and the second PUCCH resource index $n_{second\ PRB}$ may be determined according to formulas (3) and (4); or when $n_s$ mod 2=1, the first PUCCH resource index $n_{first\ PRB}$ and the second PUCCH resource index $n_{second\ PRB}$ may be determined according to formulas (5) and (6).

Alternatively, when $n_s$ mod 2=0, the first PUCCH resource index $n_{first\ PRB}$ and the second PUCCH resource index $n_{second\ PRB}$ may be determined according to formulas (5) and (6); or when $n_s$ mod 2=1, the first PUCCH resource index $n_{first\ PRB}$ and the second PUCCH resource index $n_{second\ PRB}$ may be determined according to formulas (3) and (4).

Optionally, the method 600 may further include: sending the first PUCCH and the second PUCCH, where information carried by the first PUCCH and information carried by the second PUCCH meet a preset relationship.

For example, the information carried by the first PUCCH and the information carried by the second PUCCH meet a preset time sequence, a preset bit (bit) sequence, or a preset modulation symbol sequence. For example, uplink control information is determined, and the uplink control information is divided into a first part of information and other part of information according to the bit (bit) sequence or the modulation symbol sequence. The first PUCCH carries the first part of information and the second PUCCH carries the latter part of information.

Alternatively, the information carried by the first PUCCH and the information carried by the second PUCCH may be distinguished by information content or information type. For example, when the uplink control information includes multiple types of information, the multiple types of information may be divided into two parts by type or content, so that the first PUCCH carries a first part of information and the second PUCCH carries a second part of information. For example, the uplink control information includes CSI, HARQ, and SR, so that the first PUCCH carries the CSI and the HARQ and the second PUCCH carries the SR.

That is, a relationship may be preset between the information carried by the first PUCCH and the information carried by the second PUCCH, so that after receiving the first PUCCH and the second PUCCH, the network device can accurately restore, according to the preset relationship, the information carried by the first PUCCH and the information carried by the second PUCCH.

Optionally, the method 600 may further include:

determining uplink control information and dividing the uplink control information into a first part of information and a second part of information, where the first part of information and the second part of information meet a preset relationship; and sending the first PUCCH and the second PUCCH, where the first PUCCH carries the first part of information and the second PUCCH carries the second part of information.

For example, if a quantity of modulated symbols of the uplink control information is z, the first PUCCH may carry $$(0 \sim \lfloor \tfrac{z}{2} \rfloor - 1)$$

modulated QPSK symbols, and the second PUCCH may carry $$(\lfloor \tfrac{z}{2} \rfloor \sim z - 1)$$

modulated QPSK symbols. It may be equivalent to that the first PUCCH may carry first $$\lfloor \tfrac{z}{2} \rfloor$$

modulated QPSK symbols of the uplink control information, and the second PUCCH may carry latter $$z - \lfloor \tfrac{z}{2} \rfloor$$

modulated QPSK symbols of the uplink control information, where z is a positive integer that is greater than or equal to 0.

For another example, if a quantity of encoded bits of the uplink control information is z, the first PUCCH may carry $$(0 \sim \lfloor \tfrac{x}{2} \rfloor - 1)$$

encoded bits, and the second PUCCH may carry $$(\lfloor \tfrac{x}{2} \rfloor \sim x - 1)$$

encoded bits. It may be equivalent to that the first PUCCH may carry first $$\lfloor \tfrac{x}{2} \rfloor$$

modulated bits of the uplink control information, and the second PUCCH may carry latter $$x - \lfloor \tfrac{x}{2} \rfloor$$

modulated bits of the uplink control information, where x is a positive integer that is greater than or equal to 0.

Optionally, before the first PUCCH and the second PUCCH are sent, the information carried by the first PUCCH and the information carried by the second PUCCH may be further determined according to an information type and/or an information bit length of the uplink control information.

For example, when the uplink control information includes at least one type of information of CSI, HARQ, or SR, and a length of the uplink control information is less than or equal to a preset length (for example, 11 bits), either the first PUCCH or the second PUCCH can carry all uplink control information. It may be understood that in this case, the information carried by the first PUCCH and the information carried by the second PUCCH are exactly the same.

For example, when the uplink control information includes at least one type of information of CSI, HARQ, or SR, and a length of the uplink control information is greater than a preset length (for example, 11 bits), the uplink control information may be divided into a first part of information and a second part of information, so that the first PUCCH carries the first part of information and the second PUCCH carries the second part of information.

That is, when the length of the uplink control information is less than or equal to the preset length, the uplink control information may be carried on the two PUCCHs at the same time. In this case, information carried by the two PUCCHs is the same. When the length of the uplink control information is greater than the preset length, the uplink control information may be divided into two parts of information, and each PUCCH carries one part of information. Information carried by the two PUCCHs constitutes all the uplink control information. For a method in which the uplink control information is considered as an entirety to be divided, reference may be made to the foregoing description.

When the uplink control information includes multiple types of information, only some types of information in the uplink control information may be divided into two parts of information to be carried respectively on the two PUCCHs, and remaining types of information may be carried on the two PUCCHs at the same time. For details, reference may be made to the following two examples described.

For example, when the uplink control information includes CSI, and further includes HARQ and/or SR, and a length of the uplink control information is greater than a preset length (for example, 11 bits), the CSI in the uplink control information is divided into a first part of information and a second part of information, so that the first PUCCH carries the first part of information, and the HARQ and/or the SR, and the second PUCCH carries the second part of information, and the HARQ and/or the SR. It may be understood that in this case, the HARQ and/or the SR carried by the first PUCCH and the HARQ and/or the SR carried by the second PUCCH are exactly the same.

For example, when the uplink control information includes CSI, HARQ, and SR, and a length of the uplink control information is greater than a preset length (for example, 11 bits), the CSI and the HARQ in the uplink control information is divided into a first part of information and a second part of information, so that the first PUCCH carries the first part of information and the SR, and the second PUCCH carries the second part of information and the SR. It may be understood that in this case, the SR carried by the first PUCCH and the SR carried by the second PUCCH are exactly the same.

The term "and/or" in this specification describes only an association relationship for describing associated objects and represents that three relationships may exist. For example, A and/or B may represent the following three cases: Only A exists, both A and B exist, and only B exists.

After the first PUCCH and the second PUCCH are determined, more PUCCH resources may be further determined in the $(n+k)^{th}$ timeslot, so that more PUCCHs are sent in the $(n+k)^{th}$ timeslot. For example, a third PUCCH may be determined according to the first PUCCH resource index and the resource offset information. For a specific process, reference may be made to the method for determining the second PUCCH resource, and details are not described herein again.

Therefore, according to the method for determining a physical uplink control channel resource in this embodiment of the present invention, two physical uplink control channel resources can be allocated in one timeslot, thereby resolving a problem that one physical uplink control channel in one timeslot cannot carry all content.

FIG. 7 is a schematic flowchart of a method 700 for determining a physical uplink control channel PUCCH resource according to another embodiment of the present invention. The method 700 corresponds to the method 600. To avoid repetition, corresponding descriptions are omitted properly herein. The method 700 is implemented by a network device. As shown in FIG. 7, the method 700 may include the following steps.

710: Send a physical downlink control channel in an $n^{th}$ timeslot to a user UE, so that the UE determines, according to a first resource index offset, a first PUCCH resource index of a first PUCCH in an $(n+k)^{th}$ timeslot corresponding to the physical downlink control channel, where the first resource index offset is used to indicate an offset of the resource index of the first PUCCH.

720: Send resource offset information to the UE, where the resource offset information is used to indicate offset information of a resource on which a second PUCCH in the $(n+k)^{th}$ timeslot is located, so that the UE determines, according to the first PUCCH resource index and the resource offset information, an index of a second PRB on which the second PUCCH in the $(n+k)^{th}$ timeslot is located, and a second PUCCH resource of the second PUCCH on the second PRB.

Therefore, according to the method for determining a physical uplink control channel resource in this embodiment of the present invention, two physical uplink control channel resources can be allocated in one timeslot, thereby resolving a problem that one physical uplink control channel in one timeslot cannot carry all content.

It should be understood that in this embodiment of the present invention, a length of one timeslot may be a length of t SC-FDMA symbols, and t is a positive integer that is less than or equal to 7. For example, the length of one timeslot may be 0.5 ms or may be less than 0.5 ms. When the length of one timeslot is less than 0.5 ms, a TTI length is equal to the length of the timeslot.

Optionally, the first resource index offset may be sent to the UE by using higher layer signaling.

Optionally, the resource offset information includes a first relative offset and a second relative offset, the first relative offset is an offset of the index of the second PRB relative to the index of the first PRB, and the second relative offset is an offset of the second PUCCH resource relative to the first PUCCH resource.

Correspondingly, in step 720, the first relative offset and the second relative offset are sent to the UE.

The first relative offset may be sent to the UE by using higher layer signaling or a PDCCH/EPDCCH, and the second relative offset may be sent to the UE by using the PDCCH/EPDCCH.

The second relative offset in this embodiment of the present invention is a relative value and has a small amount of information. This can reduce signaling overhead of a PDCCH/EPDCCH of a network device and can improve usage of physical downlink resources.

Optionally, the resource offset information may include a first relative offset and the second PUCCH resource, and the first relative offset is an offset of the index of the second PRB relative to the index of the first PRB.

Correspondingly, in step 720, the first relative offset and the second PUCCH resource are sent to the UE.

The first relative offset and the second PUCCH resource are sent to the UE by using a PDCCH/EPDCCH.

In this embodiment of the present invention, a second PUCCH resource index is sent to the UE, so that the UE can directly determine a resource of the second PUCCH in a PRB, and the configuration is flexible.

Optionally, the method 700 may further include: receiving a first PUCCH and a second PUCCH in the $(n+k)^{th}$ timeslot. The first PUCCH and the second PUCCH include feedback information of a PDSCH in the $n^{th}$ timeslot. Whether to retransmit downlink data is determined according to the feedback information.

Optionally, the method 700 may further include: sending indication information to the UE, where the indication information is used to indicate the preset relationship that the second PUCCH resource and the first PUCCH resource meet. The preset relationship that the second PUCCH resource and the first PUCCH resource meet may be that the second PUCCH resource is identical to the first PUCCH resource.

Optionally, the method 700 may further include: receiving the first PUCCH and the second PUCCH, where information carried by the first PUCCH and information carried by the second PUCCH meet a preset relationship.

Therefore, according to the method for determining a physical uplink control channel resource in this embodiment of the present invention, two physical uplink control channel resources can be allocated in one timeslot, thereby resolving a problem that one physical uplink control channel in one timeslot cannot carry all content.

A person of ordinary skill in the art may be aware that, the units and algorithm steps in the examples described with reference to the embodiments disclosed in this specification may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, multiple units or components may be combined or integrated into another system, or some features may be ignored or not performed. In addition, the displayed or discussed mutual couplings or direct couplings or communication connections may be implemented through some interfaces, indirect couplings or communication connections between the apparatuses or units, or electrical connections, mechanical connections, or connections in other forms.

The units described as separate parts may or may not be physically separate, and parts displayed as units may or may not be physical units, may be located in one position, or may be distributed on multiple network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present invention essentially, or the part contributing to the conventional art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of the present invention. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A user equipment (UE), comprising:
   a receiver;
   a transmitter;
   a processor; and
   a non-transitory computer-readable medium including computer-executable instructions that, when executed by the processor, facilitate the UE carrying out a method comprising:
   receiving, by the receiver cooperatively operating with the processor, a physical downlink control channel (PDCCH) in an $n^{th}$ timeslot, wherein n is a positive integer;
   determining, by the processor, a first physical uplink control channel (PUCCH) resource index of a first PUCCH in an $(n+k)^{th}$ timeslot according to a first resource index offset and a minimum index value, wherein the first resource index offset indicates an offset of the resource index of the first PUCCH, the first resource index offset is obtained from higher layer signaling, the minimum index value is a minimum index value of a control channel element that carries the physical downlink control channel, and k is a preset positive integer;
   determining, by the processor, according to the first PUCCH resource index, an index of a second physical resource block (PRB) on which a second PUCCH in the $(n+k)^{th}$ timeslot is located, and a second PUCCH resource on the second PRB; and
   sending, by the transmitter cooperatively operating with the processor, the first PUCCH and the second PUCCH, wherein an information carried by the first PUCCH and an information carried by the second PUCCH meet a preset relationship,
   wherein the first PUCCH and the second PUCCH carry an uplink control information,
   wherein the uplink control information includes at least one type of information taken from the group consisting of:
   feedback information for a physical downlink shared channel (PDSCH) in the $n^{th}$ timeslot;
   a channel state information (CSI) of a downlink; and
   a scheduling request (SR).

2. The user equipment according to claim 1, wherein the method further comprises:
   receiving, by the receiver cooperatively operating with the processor, resource offset information, wherein the resource offset information indicates offset information of a resource on which the second PUCCH in the $(n+k)^{th}$ timeslot is located; and
   determining, by the processor, the index of the second PRB and the second PUCCH resource according to the first PUCCH resource index and the resource offset information.

3. The user equipment according to claim 2, wherein the method further comprises:
  determining, by the processor, a relative offset of a second resource index according to the resource offset information, wherein the relative offset of the second resource index is an offset of a second PUCCH resource index relative to the first PUCCH resource index;
  determining, by the processor, the second PUCCH resource index according to the first PUCCH resource index and the relative offset of the second resource index; and
  determining, by the processor, the index of the second PRB and the second PUCCH resource according to the second PUCCH resource index.

4. The user equipment according to claim 3, wherein the method further comprises obtaining, by the processor, the second PUCCH resource index by the following:
  when m mod 2=0, the second PUCCH resource index=the first PUCCH resource index+the relative offset of the second resource index; or
  when m mod 2=1, the second PUCCH resource index=the first PUCCH resource index−the relative offset of the second resource index,
  wherein m is an index of the first PRB, and m is an integer that is greater than or equal to 0.

5. The user equipment according to claim 2, wherein the resource offset information comprises a first relative offset and a second relative offset, wherein the first relative offset is an offset of the index of the second PRB relative to the index of the first PRB, and wherein the second relative offset is an offset of the second PUCCH resource relative to the first PUCCH resource; and
  the method further comprises:
    receiving, by the receiver cooperatively operating with the processor, the first relative offset and the second relative offset; and
    determining, by the processor, the relative offset of the second resource index according to the first relative offset and the second relative offset.

6. The user equipment according to claim 5, wherein the method further comprises determining, by the processor, the relative offset of the second resource index according to the following:

$$N=i*c*N_{SC}^{RB}/\Delta_{shift}^{PUCCH}+j,$$

wherein N is the relative offset of the second resource index, i is the first relative offset, j is the second relative offset, c is a quantity of orthogonal sequences used within one PRB, $N_{SC}^{RB}$ is a quantity of subcarriers in a frequency domain within one PRB, and $\Delta_{shift}^{PUCCH}$ is a cyclic shift process of a PUCCH.

7. The user equipment according to claim 2, wherein the resource offset information comprises a first relative offset and the second PUCCH resource, and the first relative offset is an offset of the index of the second PRB relative to the index of the first PRB; and
  wherein the method further comprises:
    receiving, by the receiver cooperatively operating with the processor, the first relative offset and the second PUCCH resource; and
    determining, by the processor, the relative offset of the second resource index according to the first relative offset and the second PUCCH resource.

8. The user equipment according to claim 7, wherein the method further comprises determining, by the processor, the relative offset of the second resource index according to the following:

$$N=v*c*N_{SC}^{RB}/\Delta_{shift}^{PUCCH}+t,$$

wherein N is the relative offset of the second resource index, v is the first relative offset, t is the second PUCCH resource, c is a quantity of orthogonal sequences used within one PRB, $N_{SC}^{RB}$ is a quantity of subcarriers in a frequency domain within one PRB, $\Delta_{shift}^{PUCCH}$ is a cyclic shift process of a PUCCH, t is any integer in $\{0 \sim c*N_{SC}^{RB}/\Delta_{shift}^{PUCCH}-1\}$, and v is an integer that is greater than or equal to 0.

9. The user equipment according to claim 1, wherein the method further comprises:
  determining, by the processor according to the first PUCCH resource index, an index of a first PRB on which the first PUCCH in the $(n+k)^{th}$ timeslot is located, and a first PUCCH resource of the first PUCCH on the first PRB;
  determining, by the processor, the second PUCCH resource according to the first PUCCH resource, wherein the second PUCCH resource and the first PUCCH resource meet a preset relationship; and
  determining, by the processor, the index of the second PRB according to the index of the first PRB.

10. The user equipment according to claim 9, wherein the method further comprises the processor:
  determining, when m mod 2=0, that the index of the second PRB is m+q; or
  determining, when m mod 2=1, that the index of the second PRB is m−q,
  where:
    m is the index of the first PRB, m is an integer that is greater than or equal to 0, q is any integer in $\{0 \sim \lfloor N_{RB}^{UL}/2 \rfloor\}$, and $N_{RB}^{UL}$ is a quantity of uplink bandwidth resource blocks.

11. A network device, comprising:
  a processor; and
  a non-transitory computer readable memory, coupled with the processor and storing processor-executable instructions which when executed causes the processor to implement operations including:
    sending a physical downlink control channel (PDCCH) in an $n^{th}$ timeslot to a user equipment (UE), wherein the PDCCH enables the UE to determine, according to a first resource index offset, a first physical uplink control channel (PUCCH) resource index of a first PUCCH in an $(n+k)^{th}$ timeslot corresponding to the PDCCH, wherein the first resource index offset indicates an offset of the resource index of the first PUCCH, n is a positive integer and k is a preset positive integer; and
    sending a resource offset information to the UE, wherein the resource offset information indicates offset information of a resource on which a second PUCCH in the $(n+k)^{th}$ timeslot is located, wherein the second resource offset information enables the UE to determine, according to the first PUCCH resource index and the resource offset information, an index of a second process resource block (PRB) on which the second PUCCH in the $(n+k)^{th}$ timeslot is located, and a second PUCCH resource of the second PUCCH on the second PRB; and
    receiving the first PUCCH and the second PUCCH, wherein an information carried by the first PUCCH and an information carried by the second PUCCH meet a preset relationship;
    wherein the first PUCCH and the second PUCCH carry an uplink control information, wherein the uplink control information includes at least one type of information taken from the group consisting of:
: feedback information for a physical downlink shared channel (PDSCH) in the $n^{th}$ timeslot;
: a channel state information (CSI) of a downlink; and
: a scheduling request (SR).

12. The network device according to claim 11, wherein the resource offset information comprises a first relative offset and a second relative offset, wherein the first relative offset is an offset of the index of the second PRB relative to an index of a first PRB, and wherein the second relative offset is an offset of the second PUCCH resource relative to the first PUCCH resource; and
: wherein the sending the resource offset information to the UE comprises:
: sending the first relative offset and the second relative offset to the UE.

13. A method for determining a physical uplink control channel (PUCCH) resource, comprising:
: receiving a physical downlink control channel (PDCCH) in an $n^{th}$ timeslot, wherein n is a positive integer;
: determining a first PUCCH resource index of a first PUCCH in an $(n+k)^{th}$ timeslot according to a first resource index offset and a minimum index value, wherein the first resource index offset indicates an offset of the resource index of the first PUCCH, the first resource index offset is obtained from higher layer signaling, the minimum index value is a minimum index value of a control channel element that carries the physical downlink control channel, and k is a preset positive integer;
: determining, according to the first PUCCH resource index, an index of a second physical resource block (PRB) on which a second PUCCH in the $(n+k)^{th}$ timeslot is located, and a second PUCCH resource on the second PRB; and
: sending the first PUCCH and the second PUCCH, wherein an information carried by the first PUCCH and an information carried by the second PUCCH meet a preset relationship,
: wherein the first PUCCH and the second PUCCH carry an uplink control information,
: wherein the uplink control information includes at least one type of information taken from the group consisting of:
: feedback information for a physical downlink shared channel (PDSCH) in the $n^{th}$ timeslot;
: a channel state information (CSI) of a downlink; and
: a scheduling request (SR).

14. The method according to claim 13, further comprising:
: receiving resource offset information, wherein the resource offset information indicates offset information of a resource on which the second PUCCH in the $(n+k)^{th}$ timeslot is located; and
: wherein the determining the index of the second PRB and the second PUCCH resource comprises:
: determining the index of the second PRB and the second PUCCH resource according to the first PUCCH resource index and the resource offset information.

15. The method according to claim 14, wherein the determining the index of the second PRB and the second PUCCH resource according to the first PUCCH resource index and the resource offset information comprises:
: determining a relative offset of a second resource index according to the resource offset information, wherein the relative offset of the second resource index is an offset of a second PUCCH resource index relative to the first PUCCH resource index;
: determining the second PUCCH resource index according to the first PUCCH resource index and the relative offset of the second resource index; and
: determining the index of the second PRB and the second PUCCH resource according to the second PUCCH resource index.

16. A method for determining a physical uplink control channel (PUCCH) resource, comprising:
: sending a physical downlink control channel (PDCCH) in an $n^{th}$ timeslot to a user UE, wherein the PCCCH enables the UE to determine, according to a first resource index offset, a first PUCCH resource index of a first PUCCH in an $(n+k)^{th}$ timeslot corresponding to the PDCCH, wherein the first resource index offset indicates an offset of the resource index of the first PUCCH, n is a positive integer and k is a preset positive integer; and
: sending a resource offset information to the UE, wherein the resource offset information indicates offset information of a resource on which a second PUCCH in the $(n+k)^{th}$ timeslot is located, wherein the second resource offset information enables the UE to determine, according to the first PUCCH resource index and the resource offset information, an index of a second process resource block (PRB) on which the second PUCCH in the $(n+k)^{th}$ timeslot is located, and a second PUCCH resource of the second PUCCH on the second PRB; and
: receiving the first PUCCH and the second PUCCH, wherein an information carried by the first PUCCH and an information carried by the second PUCCH meet a preset relationship;
: wherein the first PUCCH and the second PUCCH carry an uplink control information,
: wherein the uplink control information includes at least one type of information taken from the group consisting of:
: feedback information for a physical downlink shared channel (PDSCH) in the $n^{th}$ timeslot;
: a channel state information (CSI) of a downlink; and
: a scheduling request (SR).

17. The method according to claim 16, wherein the resource offset information comprises a first relative offset and a second relative offset, wherein the first relative offset is an offset of the index of the second PRB relative to an index of a first PRB, and wherein the second relative offset is an offset of the second PUCCH resource relative to the first PUCCH resource; and
: wherein the sending the resource offset information to the UE comprises:
: sending the first relative offset and the second relative offset to the UE.

* * * * *